(12) United States Patent
Burchetta et al.

(10) Patent No.: US 8,494,970 B2
(45) Date of Patent: *Jul. 23, 2013

(54) COMPUTERIZED DISPUTE RESOLUTION SYSTEM AND METHOD

(75) Inventors: James D. Burchetta, New York, NY (US); Charles S. Brofman, Waccabuc, NY (US)

(73) Assignee: Cybersettle Holdings, Inc., Stamford, CT (US)

( * ) Notice: Subject to any disclaimer, the term of this patent is extended or adjusted under 35 U.S.C. 154(b) by 1303 days.

This patent is subject to a terminal disclaimer.

(21) Appl. No.: 11/981,456

(22) Filed: Oct. 30, 2007

(65) Prior Publication Data

US 2008/0126266 A1 May 29, 2008

Related U.S. Application Data

(63) Continuation of application No. 11/549,417, filed on Oct. 13, 2006, now abandoned, which is a continuation of application No. 10/683,819, filed on Oct. 10, 2003, now Pat. No. 7,249,114, which is a continuation-in-part of application No. 09/370,394, filed on Aug. 6, 1999, now Pat. No. 6,954,741, which is a continuation-in-part of application No. 09/130,154, filed on Aug. 6, 1998, now Pat. No. 6,330,551.

(51) Int. Cl.
*G06Q 50/00* (2012.01)
*G06Q 10/00* (2012.01)

(52) U.S. Cl.
USPC ............................. 705/80; 705/37; 705/4

(58) Field of Classification Search
USPC .................. 705/1, 4, 37, 80, 500, 1.1
See application file for complete search history.

(56) References Cited

U.S. PATENT DOCUMENTS

| | | | |
|---|---|---|---|
| 3,573,747 A | 4/1971 | Adams et al. | 705/37 |
| 3,581,072 A | 5/1971 | Nymeyer | 705/37 |

(Continued)

FOREIGN PATENT DOCUMENTS

| | | |
|---|---|---|
| JP | 2002-092376 | 3/2002 |
| JP | 2002-366788 | 12/2002 |

(Continued)

OTHER PUBLICATIONS (Docket No. 1) Complaint against National Arbitration Forum, Inc. (Filing fee $150 receipt No. 326323.), filed by Cybersettle, Inc. (cw,) (Entered: Sep. 29, 2004).

(Continued)

*Primary Examiner* — Nicholas D Rosen
(74) *Attorney, Agent, or Firm* — William S. Frommer; Brian M. McGuire; Frommer Lawrence & Haug LLP

(57) ABSTRACT

A method and system for automated dispute resolution is disclosed. The method and system are used in testing non-equal values in normal rounds for satisfaction of a condition. If the condition is not satisfied in the normal rounds, power round values are tested for satisfaction of a power round condition. If the power round condition is satisfied, a binding settlement payment is calculated. The awardee of the settlement payment is offered a plurality of disbursement options for the settlement payment which he or she may choose from. Additional options involve an automated facilitator, windfalls to initiators, automatic payment initiation, multiparty aggregation and automatic settlement document generation.

38 Claims, 8 Drawing Sheets

U.S. PATENT DOCUMENTS

| | | | | |
|---|---|---|---|---|
| 5,077,665 | A | 12/1991 | Silverman et al. | 705/37 |
| 5,329,589 | A | 7/1994 | Fraser et al. | 379/91.02 |
| 5,495,412 | A | 2/1996 | Thiessen | 705/1 |
| 5,508,912 | A | 4/1996 | Schneiderman | 705/3 |
| 5,668,953 | A | 9/1997 | Sloo | 705/1 |
| 5,689,652 | A | 11/1997 | Lupien et al. | 705/37 |
| 5,699,089 | A | 12/1997 | Murray | 715/823 |
| 5,745,706 | A * | 4/1998 | Wolfberg et al. | 705/35 |
| 5,764,890 | A | 6/1998 | Glasser et al. | 726/11 |
| 5,781,632 | A * | 7/1998 | Odom | 705/78 |
| 5,781,901 | A | 7/1998 | Kuzma | 1/1 |
| 5,794,207 | A | 8/1998 | Walker et al. | 705/1 |
| 5,826,241 | A * | 10/1998 | Stein et al. | 705/26 |
| 5,890,138 | A | 3/1999 | Godin et al. | 705/26 |
| 5,895,450 | A | 4/1999 | Sloo | 705/1 |
| 5,905,975 | A | 5/1999 | Ausubel | 705/37 |
| 5,924,082 | A | 7/1999 | Silverman et al. | 705/37 |
| 5,937,048 | A | 8/1999 | Pelle | 379/201.12 |
| 5,956,687 | A | 9/1999 | Wamsley et al. | 705/1 |
| 5,970,472 | A | 10/1999 | Allsop et al. | 705/26 |
| 5,983,205 | A | 11/1999 | Brams et al. | 705/37 |
| 6,052,674 | A | 4/2000 | Zervides et al. | 705/40 |
| 6,064,981 | A | 5/2000 | Barni et al. | 705/26 |
| 6,078,898 | A | 6/2000 | Davis et al. | 705/19 |
| 6,112,181 | A | 8/2000 | Shear et al. | 705/1 |
| 6,112,189 | A | 8/2000 | Rickard et al. | 705/36 R |
| 6,131,087 | A | 10/2000 | Luke et al. | 705/26 |
| 6,141,653 | A | 10/2000 | Conklin et al. | 705/80 |
| 6,208,973 | B1 | 3/2001 | Boyer et al. | 705/2 |
| 6,243,691 | B1 | 6/2001 | Fisher et al. | 705/37 |
| 6,285,987 | B1 | 9/2001 | Roth et al. | 705/27 |
| 6,330,551 | B1 | 12/2001 | Burchetta et al. | 705/80 |
| 6,343,271 | B1 | 1/2002 | Peterson et al. | 705/4 |
| 6,366,925 | B1 | 4/2002 | Meltzer et al. | 705/1 |
| 6,401,080 | B1 | 6/2002 | Bigus et al. | 705/37 |
| 6,598,027 | B1 | 7/2003 | Breen et al. | |
| 6,847,935 | B1 | 1/2005 | Solomon et al. | 705/14 |
| 6,954,741 | B1 | 10/2005 | Burchetta et al. | 705/80 |
| 7,249,114 | B2 | 7/2007 | Burchetta et al. | 705/80 |
| 7,831,523 | B2 * | 11/2010 | Burchetta et al. | 705/80 |
| 2001/0039527 | A1 | 11/2001 | Ordish et al. | 705/37 |
| 2002/0007362 | A1 | 1/2002 | Collins et al. | 707/5 |
| 2002/0091532 | A1 | 7/2002 | Viets et al. | 705/1 |
| 2004/0073498 | A1 | 4/2004 | Breen et al. | |
| 2004/0210540 | A1 | 10/2004 | Israel et al. | 705/80 |
| 2005/0203785 | A1 | 9/2005 | Kixmiller | 705/7 |
| 2006/0080186 | A1 | 4/2006 | Burchetta et al. | 705/26 |
| 2007/0106621 | A1 | 5/2007 | Burchetta et al. | 705/80 |
| 2007/0150377 | A1 | 6/2007 | Burchetta et al. | 705/27 |
| 2008/0065557 | A1 | 3/2008 | Burchetta et al. | 705/80 |
| 2008/0065558 | A1 | 3/2008 | Burchetta et al. | 705/80 |
| 2008/0126266 | A1 | 5/2008 | Burchetta et al. | 705/80 |
| 2008/0140582 | A1 | 6/2008 | Burchetta et al. | 705/80 |

FOREIGN PATENT DOCUMENTS

| | | |
|---|---|---|
| WO | WO 97/04410 A1 | 2/1997 |
| WO | WO 97/15362 A1 | 5/1997 |
| WO | WO 00/68865 | 11/2000 |

OTHER PUBLICATIONS (Docket No. 5) Answer to Complaint, Seperate Defenses, Counter-claim against Cybersettle, Inc. by National Arbitration Forum, Inc. (Confoy, Karen) (Entered: Jan. 12, 2005).
(Docket No. 8) Claim Plaintiffs Reply to Defendant's Counterclaims by Cybersettle, Inc., Cybersettle, Inc. (Lattimore, Jason) (Entered: Jan. 26, 2005).
(Docket No. 9) Plaintiff's Answer to Counterclaim of Defendent by Cybersettle, Inc., (Lattimore, Jason) (Entered: Jan. 27, 2005).
(Docket No. 16) Motion for Leave to File a First Amended Complaint by Cybersettle, Inc., Cybersettle, Inc. (Attachments: Exhibits #1-#15 to Declaration (Weider, Douglas) (Entered: Oct. 27, 2005).
(Docket No. 19) Response in Opposition re 16 Motion for Leave to File a First Amended Complaint filed by National Arbitration Forum, Inc., National Arbitration Forum, Inc., (Attachments: # 1 Declaration of Christopher E. Torkelson) (Torkelson, Christopher) (Entered: Nov. 7, 2005).
(Docket No. 20) Reply to Response to Motion re 16 Motion for Leave to File a First Amended Complaint filed by Cybersettle, Inc. (Weider, Douglas (Entered: Nov. 18, 2005).
(Docket No. 25) Motion to Strike National Arbitration Forum Inc.'s Defenses and Counterclaim that the '551 Patent is Obvious . . . (Weider, Douglas) (Entered: Dec. 7, 2005).
(Docket No. 26) Declaration of Brian M. McGuire re 25 Motion to Strike . . . (Weider, Douglas) (Entered: Dec. 7, 2005).
(Docket No. 30) Amended Complaint (First) against National Arbitration Forum, Inc., National Arbitration Forum, Inc . . . (Weider, Douglas) (Entered: Dec. 16, 2005).
(Docket No. 34) Response in Opposition re 25 Motion to Strike . . . (Torkelson, Christopher) (Entered: Jan. 10, 2006).
(Docket No. 35) Brief (Reply) in Further Support of its Motion to Strike . . . (Weider, Douglas) (Entered: Jan. 12, 2006).
(Docket No. 36) Answer to Amended Complaint Separate Defenses . . . (Confoy, Karen) (Entered: Jan. 13, 2006).
(Docket No. 37) Order dismissing as 25 Motion to Strike & for partial summary judgment . . . Signed by Judge John J. Hughes on Jan. 17, 2006. (ck) (Entered: Jan. 23, 2006).
(Docket No. 38) Plaintiff's Reply/ Answer to Counterclaim . . . (Weider, Douglas) (Entered: Jan. 24, 2006).
(Docket No. 39) Stipulation by National Arbitration Forum, Inc . . . (Confoy, Karen) (Entered: Feb. 6, 2006).
(Docket No. 40) Stipulation and Order of Dismissal . . . (Confoy, Karen) (Entered: Feb. 6, 2006).
(Docket No. 42) Stipulation and Order dismissing w/ prejudice . . . Signed by Judge Mary L. Cooper on Feb. 8, 2006 (ck) (Entered: Feb. 8, 2006).
(Docket No. 46) Motion for Summary Judgment of Infringement by Cybersettle, Inc . . . ((Weider, Douglas) (Entered: Mar. 24, 2006).
(Docket No. 47) Motion for Summary Judgment Memorandum in Support of . . . (Weider, Douglas) (Entered: Mar. 24, 2006).
(Docket No. 48) Declaration of Daniel A. Ladow re 46 Motion for Summary Judgment . . . (Weider, Douglas) (Entered: Mar. 24, 2006).
(Docket No. 53) Brief in Support re 46 Motion for Summary Judgment of Infringement filed by CYBERSETTLE, Inc.. (Weider, Douglas) (Entered: Mar. 30, 2006).
(Docket No. 60) Reply to Response to Motion re 46 Motion . . . (Weider, Douglas) (Entered: Apr. 21, 2006).
(Docket No. 61) Statement of Material Facts in Opposition re 56 Cross Motion for Summary Judgment . . . (Weider, Douglas) (Entered: Apr. 21, 2006).
(Docket No. 62) Brief in Support re 56 Cross Motion for Summary Judgment . . . (Confoy, Karen) (Entered: Apr. 28, 2006).
(Docket No. 63) Amended Document by National Arbitration Forum, Inc . . . (Confoy, Karen) (Entered: Apr. 28, 2006).
(Docket No. 68) Memorandum Opinion re 46 Motion for Summary Judgment . . . Signed by Judge Mary L. Cooper on Nov. 9, 2006. (ck) (Entered: Nov. 9, 2006).
U.S. District Court, Dist. of NJ [Live] (Trenton) Civil Docket for Case #: 3:04-cv-04744-MLC-JJH; filed Sep. 24, 2004.
U.S. Appl. No. 11/549,417, Burchetta et al.
U.S. Appl. No. 11/981,268, Burchetta et al.
U.S. Appl. No. 11/981,456, Burchetta et al.
U.S. Appl. No. 11/224,155, Burchetta et al.
U.S. Appl. No. 11/981,246, Burchetta et al.
U.S. Appl. No. 11/981,272, Burchetta et al.
U.S. Appl. No. 11/614,775, Burchetta et al.
U.S. Appl. No. 11/549,437, Burchetta et al.
U.S. Appl. No. 11/549,443, Burchetta et al.
U.S. Appl. No. 11/981,368, Burchetta et al.
U.S. Appl. No. 11/981,469, Burchetta et al.
U.S. Appl. No. 11/614,775, May 11, 2009, Burchetta et al., Non-Final Office Action.
U.S. Appl. No. 11/614,775, Sep. 11, 2009, Burchetta et al., Amendment.
U.S. Appl. No. 11/614,775, Sep. 15, 2009, Burchetta et al., Interview Summary re Sep. 10, 2009.
U.S. Appl. No. 11/614,775, Nov. 2, 2009, Burchetta et al., Interview Summary re Oct. 27, 2009.
U.S. Appl. No. 11/614,775, Dec. 3, 2009, Burchetta et al., Prelim. Amd from U.S. Appl. No. 11/981,268.

U.S. Appl. No. 11/614,775, Dec. 14, 2009, Burchetta et al., Notice of Allowance and Interview Summary re Dec. 3, 2009.
Stevenson, R.L., "Treasure Island," Chapter 6, 1882, from http://www.gutenberg.org/dirs/1/2/120/120.txt.
Dell'Omo, G.G., "Wage Disputes in Interest Arbitration: Arbitrators Weigh the Criteria" (Abstract only), Arbitration Journal, vol. 44, No. 2, pp. 4-13, Jun. 1989.
Kleiman, M., "Financial Success," HP Professional, vol. 5, No. 8, p. 28, Aug. 1981.
Zack, J.G., "Resolution of Disputes; The Next Generation," Transactions of AACE International, pp. 50-54, 1997.
Ozdamar, L., et al., "A Flexible Heuristic for a Multi-Mode Capital Constrained Project Scheduling Problem with Probabilistic Cash Inflows" (Abstract), Computers and & Operations Research, vol. 24, No. 12, pp. 1187-1200, Dec. 1997.
Merriam-Webster's Collegiate Dictionary, tenth edition, p. 1228, 1997.
Anon., "Treasure Island—Wikipedia, the free encyclopedia," http://en.wikipedia.org/wiki/Treasure_Island, Apr. 1, 2010.
Anon., "Sybase Adds Web-based Technical Support to its Costumer Service," Presswire, Mar. 29, 1996.
Zeng, D. Z. et al., "Double-offer Arbitration," Mathematical Social Sciences, vol. 31, No. 3, pp. 147-170, Jun. 1996.
Abstract from New York Times editorial, Tuesday, Jan. 8, 1985.
Hines, Bernard L., "Arbitration Spells Relief. (insurance settlements)," Best's Review—Propert-Casualty Insurance Edition, vol. 86, p. 47, Jan. 1986.
Jackon, William, "Mediation Proposed for Securities Disputes," Business First-Columbus, vol. 9, No. 31, p. 4, Apr. 5, 1993.
Skrzycki, Cindy, "The Regulators: An Electric Negotiation—Modern Times: OSHA to Try Writing Rules in Cyberspace," The Washington Post, Financial Section, p. D1, Feb. 8, 1994.
Stephenson, Max, "Rescuing ADR from its Advances," Public Administration Review, vol. 55, No. 4, pp. 385-388, Jul./Aug. 1995.
Grob, K., et al., "Discovering Opportunities in Alternatives Dispute Resolution: A Step-by-Step Guide for Getting Involved," Outlook, vol. 62, No. 4, p. 18, Winter 1995.
Anon., "Online Courtroom Service Introduced for U.S. Disputes," Internet Business News, Jul. 1, 1996.
Robbins, Stuart, "Lowering the Cost of Doing Business through ADR," Distribution, vol. 96, No. 11, pp. 58-59, Oct. 1997.
Negussie, Mel, "How to Select a Mediator," Defense Counsel Journal, vol. 65, No. 2, pp. 256-261, Apr. 1998.
Mullins, R. "Mediation, Arbitration Venues Offer Corporate Litigants Justice-in-Time," Business Journal-Milwaukee, vol. 9, No. 39, p. S6, Jul. 4, 1992.
Schweber, Claudine, "Your telephone May Be a Party Line: Mediation by Telephone," Mediation Quarterly, vol. 7, No. 2, pp. 191-195, Winter 1989.
Schneider Denenberg, Tia, "The Electronic Arbitrator," The Arbitrator Journal, vol. 45, No. 1, pp. 48-52, Mar. 1990.
Arnold et al., "Patent Alternative Dispute Resolution Handbook," 1991.
Brams, Steven J. and Merrill III, Samuel, "Arbitration Procedures with the Possibility of Compromise," Control and Cybernetics, vol. 21, No. 1, pp. 131-149, 1991.
Thiessen, E. et al, "Computer Assisted Negotiation of Multi-Objective Water Resources Conflicts," Water Resources Bulletin, American Water Resources Asso. vol. 28, No. 1, 1992.
Hill, Richard, "Will Cyberspace Use Cybercourts?" International Commercial Litigation, Issue 23, pp. 33-35, Oct. 1997.
Neal Yeend, Nancy, "Electronic Alternative Dispute Resolution System Design," Mediation Quarterly, vol. 11, No. 2, pp. 193-194, Winter 1993.
Shaw et al., "Using Alternative Dispute Resolution in the Federal Government," 1993.
Macduff, Ian, "Flames on the Wires: Mediating from an Electronic Cottage," Negotiation Journal, vol. 10, No. 1, pp. 5-15, Jan. 1994.
Helie, John, "Conflict and Conflict Resolution on Electronic Networks," pp. 1-6, Jun. 1994.
Schweber, C.,"The Use of Technology in Conflict Resolution," paper presented at the European Conference on Peacemaking and Conflict Resolution, Oct. 1994, San Sebastian, Spain.
Brams, Steven and Taylor, Alan, "Fair Division: From Cake-cutting to Dispute Resolution," published by Clark Boardman Callaghan, 1996.
Levin, Amanda, "Online Claim Settlement Seervices Hit the Net," The National Underwriter Company National Underwriter, Claims Services Review Section, Nov. 9, 1998.
The International Dictionary of Applied Mathematics, Van Nostrand, Princeton, 1960, p. 593.
Zeng, D. Z. et al, "Intrinsic Gap and Final-Double-Offer Arbitration," In IFAC Large Scale Systems (conference procedings), 1992.
Online Ombuds Office Website, http://aaron.sbs.umass.edu/center/ombuds/default.htm and description.html, Apr. 14, 2000.
Colen, F. H., "Proactice Patent Protection," High Technology Business, vol. 9, No. 8, p. 14, Sep.-Oct. 1989.
Low, "Mediation vs. Litigation: How You Can Cut Costs," Texas Banking, vol. 80, No. 5, pp. 8-9, May 1991.
Anon., "Title IV-Judicial Reforms:" Health Legislation and Regulation, vol. 20, No. 3, Jan. 19, 1994.
Anon., "Pru Settlement Stalls State ADR Plan," Insurance Regulator, vol. 8, No. 37 p. 1, Sep. 30, 1996.
Anon., "Pharmacists' Antitrust Class-Action Lawsuit Opens," Marketletter, Oct. 5, 1998.
Ferling, R.L. et al., "New Plans, New Policies," Best Review-Life-Health Insurance Edition, vol. 92, No. 8, p. 85, Dec. 1991.
Lewthwaite, G.A., "Paying for Years of Pain," Baltimore Morning Sun, Final Edition, p. 2A, Apr. 22, 1997.
Attrino, "P-C Agents Issue Checkbook Claims," National Underwritier, vol. 102, No. 29, pp. 15, 18, Jul. 20, 1998.
Anon., "Consultation on Periodical Payments for Future Loss," M2 Presswire, Mar. 13, 2002.
Anon., 13 Alternatives to High Cost Litig. 147, Westlaw, Nov. 1995; 1995 CPR Institute for Dispute Resolution f/k/a Center for Public Resources/CPR Legal Program.
Dauer et al., "Manual of Dispute Resolution, ADR Law and Practice," vol. 1, Ch. 1-13, Shpeard's/McGraw Hill, Inc. May 1994.
Grenig, Jay E., "West's Legal Forms, vol. 26, Alternative Dispute Resolution," St. Paul, Minn. West Publishing Co. 1995.
Grenig Jay E., "Alternative Dispute Resolution with Forms," 2d Ed., St. Paul, Minn. West Publishing Co. 1997.
Anon., "Sybase Adds Web-based Technical Support to its Customer Service," Presswire, Mar. 29, 1996.
Zeng, D.-Z. et al., "Double-offer Arbitration," Mathematical Social Sciences, vol. 31, No. 3, pp. 147-170, Jun. 1996.
Hines, Bernard L., "Arbitration Spells Relief. (insurance settlements)," Best's Review—Property-Casualty Insurance Edition, vol. 86, p. 47, Jan. 1986.
Jackson, William, "Mediation Proposed for Securities Disputes," Business First-Columbus, vol. 9, No. 31, p. 4, Apr. 5, 1993.
Skrzycki, Cindy, "The Regulators: An Electric Negotiation—Modem Times: OSHA to Try Writing Rules in Cyberspace," The Washington Post, Financial Section, p. D1, Feb. 8, 1994.
Stephenson, Max, "Rescuing ADR from its Advances", Public Administration Review, vol. 55, No. 4, pp. 385-388, Jul./Aug. 1995.
Grob, K., and Schecter, P.L., "Discovering Opportunities in Alternative Dispute Resolution: A Step-by-Step Guide for Getting Involved," Outlook, vol. 62, No. 4, p. 18, Winter 1995.
Mandell, Janette, "Cyberspace Conflicts," Software Magazine, vol. 18, No. 4, p. 20, Mar. 1998.
Mullins, R., "Mediation, Arbitration Venues Offer Corporate Litigants Justice-in-Time," Business Journal-Milwaukee, vol. 9, No. 39, p. S6, Jul. 4, 1992.
Schneider Denenberg, Tia, "The Electronic Arbitrator," The Arbitration Journal, vol. 45, No. 1, pp. 48-52, Mar. 1990.
Thiessen, Ernest and Loucks, Daniel, "Computer Assisted Negotiation of Multi-Objective Water Resources Conflicts," Water Resources Bulletin, American Water Resources Association, vol. 28, No. 1, pp. 163-177, Feb. 1992.
Hill, Richard, "Will Cyberspace Use Cybercourts?," International Commercial Litigation, Issue 23, pp. 33-35, Oct. 1997.
Shaw, et al., "Using Alternative Dispute Resolution in the Federal Government," 1993.
Helie, John, "Conflict and Conflict Resolution on Electronic Networks", pp. 1-6, Jun. 1994.

SchWeber, Claudine, "The Use of Technology in Conflict Resolution," paper presented at the European Conference on Peacemaking and Conflict Resolution, Oct. 1994, San Sebastian, Spain.

Levin, Amanda, "Online Claim Settlement Services Hit the Net," The National Underwriter Company National Underwriter, Claims Services Review Section, Nov. 9, 1998.

Zeng, D.-Z. et al., "Intrinsic Gap and Final-Double-Offer Arbitration," in IFAC Large Scale Systems (conference proceedings), 1992.

Online Ombuds Office Web site, http://aaron.sbs.umass.edu/center/ombuds/default.htm and description.html, Apr. 14, 2000.

Colen, F.H., "Proactive Patent Protection," High Technology Business, vol. 9, No. 8, p. 14, Sep.-Oct. 1989.

Anon., "Title IV—Judicial Reforms," Health Legislation and Regulation, vol. 20, No. 3, Jan. 19, 1994.

Anon., "Pru Settlement Stalls State ADR Plan," Insurance Regulator, vol. 8, No. 37, p. 1, Sep. 30, 1996.

Ferling, R. L., et al. "New Plans, New Policies," Best's Review—Life-Health Insurance Edition, vol. 92, No. 8, p. 85, Dec. 1991.

Attrino, "P-C Agents Issue Checkbook Claims," National Underwriter, vol. 102, No. 29, pp. 15, 18, Jul. 20, 1998.

Brandenburger, A. and Nalebuff, B., Web pages from Co-opetition Interactive, Settlement Escrows, A Negotiation Tool, www.mayet.som.yale.edu/coopetition, and corresponding pages from the Internet Archive at http://www.archive.org/, May 4, 1997.

Anon., "13 Alternatives to High Cost Litig. 147," Westlaw, Nov. 1995; 1995 CPR Institute for Dispute Resolution f/k/a Center for Public Resources/CPR Legal Program.

Dauer, et al., "Manual of Dispute Resolution, ADR Law and Practice," vol. 1, Ch. 1-13, Shepard's/McGraw-Hill, Inc. May 1994.

Grenig, Jay E., "West's® Legal Forms, vol. 26, Alternative Dispute Resolution," St. Paul, Minn. West Publishing Co. 1995.

Grenig, Jay E., "Alternative Dispute Resolution With Forms," 2d Ed., St. Paul, Minn. West Publishing Co. 1997.

Fritsche, Hans "Transaction exposure management in international construction" 1994 American Association of Cost Engineers Transactions 1994 Transactions pp. INT8.1-INT8.8.

O Kelly, Eugene D "A checkup for your treasury policy" Sep./Oct. 1995 Financial Executive v11n5 pp. 40-44.

Disposition: Vacated and Remanded; by Panel, Jul. 24, 2007.

Pryor, E.S., "After the Judgment," Virginia Law Review, vol. 88, No. 8, pp. 1757-1830, Dec. 2002.

U.S. Appl. No. 10/683,821, Burchetta et al.

U.S. Appl. No. 11/549,437, Amendment & Petition Oct. 14, 2009.

U.S. Appl. No. 11/549,437, Terminal Disclaimer Oct. 14, 2009.

U.S. Appl. No. 11/549,437, Amendment & Req for Rec Jan. 21, 2010.

U.S. Appl. No. 11/549,437, Final Rejection Apr. 6, 2010.

U.S. Appl. No. 11/549,417, Non-Final Office Action Feb. 23, 2009.

U.S. Appl. No. 11/549,417, Amendment & Req for Rec Oct. 14, 2009.

U.S. Appl. No. 11/284,155, Resp to Elect/Restrict Jan. 17, 2008.

U.S. Appl. No. 11/284,155, Non-Final Reject Apr. 3, 2008.

U.S. Appl. No. 11/284,155, Amend/Req for Recon Jul. 17, 2008.

U.S. Appl. No. 11/284,155, Non-Final Reject Nov. 3, 2008.

U.S. Appl. No. 11/284,155, Amend/Req for Recon Jan. 21, 2009.

U.S. Appl. No. 11/284,155, Notice of Allowance Apr. 24, 2009.

U.S. Appl. No. 10/683,821, Non-Final Rejection Sep. 8, 2005.

U.S. Appl. No. 10/683,821, Amend/Req for Recon Dec. 9, 2005.

U.S. Appl. No. 10/683,821, Final Rejection Jun. 15, 2006.

U.S. Appl. No. 10/683,821, Amend & RCE Oct. 16, 2006.

U.S. Appl. No. 10/683,821, Non-Final Reject May 18, 2007.

U.S. Appl. No. 10/683,821, Amend/Req for Recon Aug. 7, 2007.

U.S. Appl. No. 10/683,821, Non Responsive Amend Aug. 20, 2007.

U.S. Appl. No. 10/683,821, Amend/Req for Recon Sep. 13, 2007.

U.S. Appl. No. 10/683,821, Amend/Req for Recon Nov. 26, 2007.

U.S. Appl. No. 10/683,821, Sup Resp & Petition Dec. 13, 2007.

U.S. Appl. No. 10/683,821, Petition Decision Apr. 4, 2008.

U.S. Appl. No. 10/683,821, Sup Resp/Amend May 2, 2008.

U.S. Appl. No. 10/683,821, Final Rejection Jun. 9, 2009.

U.S. Appl. No. 10/683,821, Examiners Interview Dec. 8, 2009.

U.S. Appl. No. 10/683,821, Notice of Allowance Jan. 25, 2010.

U.S. Appl. No. 10/683,821, RCE & IDS Apr. 1, 2010.

Appellent Principal Brief, Feb. 16, 2007.

Appellee or Cross Appellent Principal Brief Filing Date, Mar. 28, 2007.

Appellent Reply Brief Filing Date, Apr. 16, 2007.

U.S. Appl. No. 11/224,155, Mail Non-Final Rejection Mar. 6, 2009.

U.S. Appl. No. 11/224,155, Non-Final Rejection Mar. 2, 2009.

*Apollo Enterprise Solutions* v. *Debt Resolve*; Case No. 8:2007cv00106; Filed Jan. 29, 2007; (C.D.Ca.) Docket #1 Complaint (from Exhibit A of Complaint in Dist. N.J. case, before).

*Debt Resolve, Inc.* v. *Apollo Enterprise Solutions, LLC*; Case No. 3:2007cv00103; Filed Jan. 8, 2007; .(Dist. N.J.). Docket #1 Complaint.

*Debt Resolve, Inc.* v. *Apollo Enterprise Solutions, L.L.C.*; Case No. 1:2007cv04531; Filed May 30, 2007; (SDNY). Docket #5 Answer and Counterclaim; Docket #13 Memo of Law in Support of Defendant's Motion for Summary Judgment of Patent Non-Infringement Including Statement of Facts and Exhibit 5 Deposition Transcript of C. Imrey, CEO of Appollo Enterprise Soluticn LLC; Docket #14 Debt Resolve's Opposition to Appollo's Motion for Summary Judgment; Docket #28 Dismissal.

* cited by examiner

COMPUTERIZED DISPUTE RESOLUTION SYSTEM AND METHOD

CROSS REFERENCE TO RELATED APPLICATIONS

This application is a continuation of application Ser. No. 11/549,417 filed Oct. 13, 2006 now abandoned, which is a continuation of application Ser. No. 10/683,819, now U.S. Pat. No. 7,249,114, filed Oct. 10, 2003 now U.S. Pat. No. 7,249,114 herein incorporated by reference, which is a continuation-in-part of application Ser. No. 09/370,394 filed Aug. 6, 1999, now U.S. Pat. No. 6,954,741, incorporated herein by reference, which is in turn a continuation-in-part of application Ser. No. 09/130,154 filed Aug. 6, 1998, now U.S. Pat. No. 6,330,551 incorporated herein by reference.

FIELD OF THE INVENTION

This invention relates generally to dispute resolution and more particularly to on-line automated dispute resolution among multiple adverse parties in a confidential environment.

BACKGROUND OF THE INVENTION

At the present time, it is readily apparent that a better way to resolve disputes has long been needed. Courtroom trials, once thought to be the only way to resolve legal controversies, are very costly and the outcome can be unsatisfactory for all concerned parties. The resulting disappointment with traditional litigation drove the creation of the alternative dispute resolution ("ADR") industry. However, conventional ADR, although sometimes helpful, is still costly and the results are often unacceptable.

An untold number of pending claims are ripe for settlement, but have not been resolved for reasons that have nothing to do with their merits. The present invention is based on the premise that the parties are best suited to settle those disputes but need a system that creates the opportunity for parties to successfully settle their claims easily, effectively, and inexpensively.

SUMMARY OF THE INVENTION

In general, in a first aspect, the invention features a claim resolution method. The method involves testing pairs of non-equal values, submitted by two adverse parties for a claim, for satisfaction of a condition. If the condition is not satisfied, the method further involves testing a pair of non-equal power round values, one from each of the two adverse parties for the claim, for satisfaction of a power round condition. The method further involves calculating a binding settlement payment, when the condition is satisfied by a pair of the non-equal values. The binding settlement payment is an amount at least equal to a lower of the pair of the non-equal values. The party that is awarded the settlement payment is offered a plurality of disbursement options for the settlement payment which he or she may choose from.

In general, in a second aspect, the invention features a claim resolution method. The method involves receiving values, submitted by two adverse parties for a claim. At least one of the values is submitted following a communication of a facilitating message regarding the claim, conveyed from a facilitator to at least one of the two adverse parties. The method further involves testing the pairs of non-equal values for satisfaction of a condition, and calculating a binding settlement payment, when the condition is satisfied by a pair of the non-equal values. The binding settlement payment is an amount at least equal to a lower of the pair of the non-equal values. The party that is awarded the settlement payment is offered a plurality of disbursement options for the settlement payment which he or she may choose from.

In general, in a third aspect, the invention features a dispute resolution method for resolving a claim between two adverse parties. The method involves testing pairs of non-equal values, submitted by the two adverse parties for the claim, for satisfaction of a condition. The method further involves calculating a binding settlement payment, when the condition is satisfied by a pair of the non-equal values. The binding settlement payment incorporates a windfall adjustment, when one of the parties is a dispute entry initiator for the claim, in an amount at least equal to a lower of the pair of the non-equal values adjusted by either a positive or negative windfall differential amount. The party that is awarded the settlement payment is offered a plurality of disbursement options for the settlement payment which he or she may choose from.

In general, in a fourth aspect, the invention features a dispute resolution method for resolving a claim between two adverse parties. The method involves testing pairs of non-equal values, submitted by the two adverse parties for the claim, for satisfaction of a condition. The method further involves calculating a binding settlement payment, when the condition is satisfied by a pair of the non-equal values, of an amount at least equal to a lower of the pair of the non-equal values. The party that is awarded the settlement payment is offered a plurality of disbursement options for the settlement payment which he or she may choose from. The method further involves initiating an on-line transfer of funds between the parties for the amount.

In general, in a fifth aspect, the invention features a dispute resolution method for resolving a claim between two adverse parties. The method involves testing pairs of non-equal values, submitted by the two adverse parties for the claim, for satisfaction of a condition. The method further involves calculating a binding settlement payment, when the condition is satisfied by a pair of the non-equal values, of an amount at least equal to a lower of the pair of the non-equal values. The method further involves automatically, when the condition is satisfied, generating a settlement document for the claim containing case specific information. The party that is awarded the settlement payment is offered a plurality of disbursement options for the settlement payment which he or she may choose from.

In general, in a sixth aspect, the invention features systems which operate according to the disclosed techniques via an on-line interface.

Particular embodiments of the invention may feature one or more of the following advantages: lower cost for each party from initiation through resolution, versus a litigation; or an increased probability of settlement for some claims; encouragement that the case may settle; some indication that a settlement may actually be reached; higher customer satisfaction with the claim resolution; attraction of a higher number of claims to the system; lower coat to initiators relative to hiring a lawyer to engage the system or file and prosecute a lawsuit; greater comfort for claimants engaging the system because the legal knowledge necessary to draft a simple dismissal, release or settlement agreement is not needed; lower cost because an attorney is not needed or minimally needed to memorialize the settlement; consolidation and simplification of multiparty negotiations into effectively a two party negotiation; greater flexibility for claimants since they control the particular method of payment; faster receipt of settlement proceeds; or smaller likelihood of post settlement defaults by defendants.

Particular embodiments of systems incorporating the invention may feature one or more of the following additional advantages: the ability for individuals to directly contact and engage in a dispute resolution negotiation; the ability to receive an immediate or direct crediting, transfer or initiation of a transfer of the value arrived at through the settlement negotiation; or the ability to receive a windfall adjustment if a negotiation results in a settlement by being an initiator.

The above advantages and features are of representative embodiments only, and are presented only to assist in understanding the invention. It should be understood that they are not to be considered limitations on the invention as defined by the claims, or limitations on equivalents to the claims. For instance, some pairs of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The following detailed description may best be understood by reference to the following description in conjunction with the accompanying drawings in which.

DETAILED DESCRIPTION OF THE INVENTION

Figure 1:
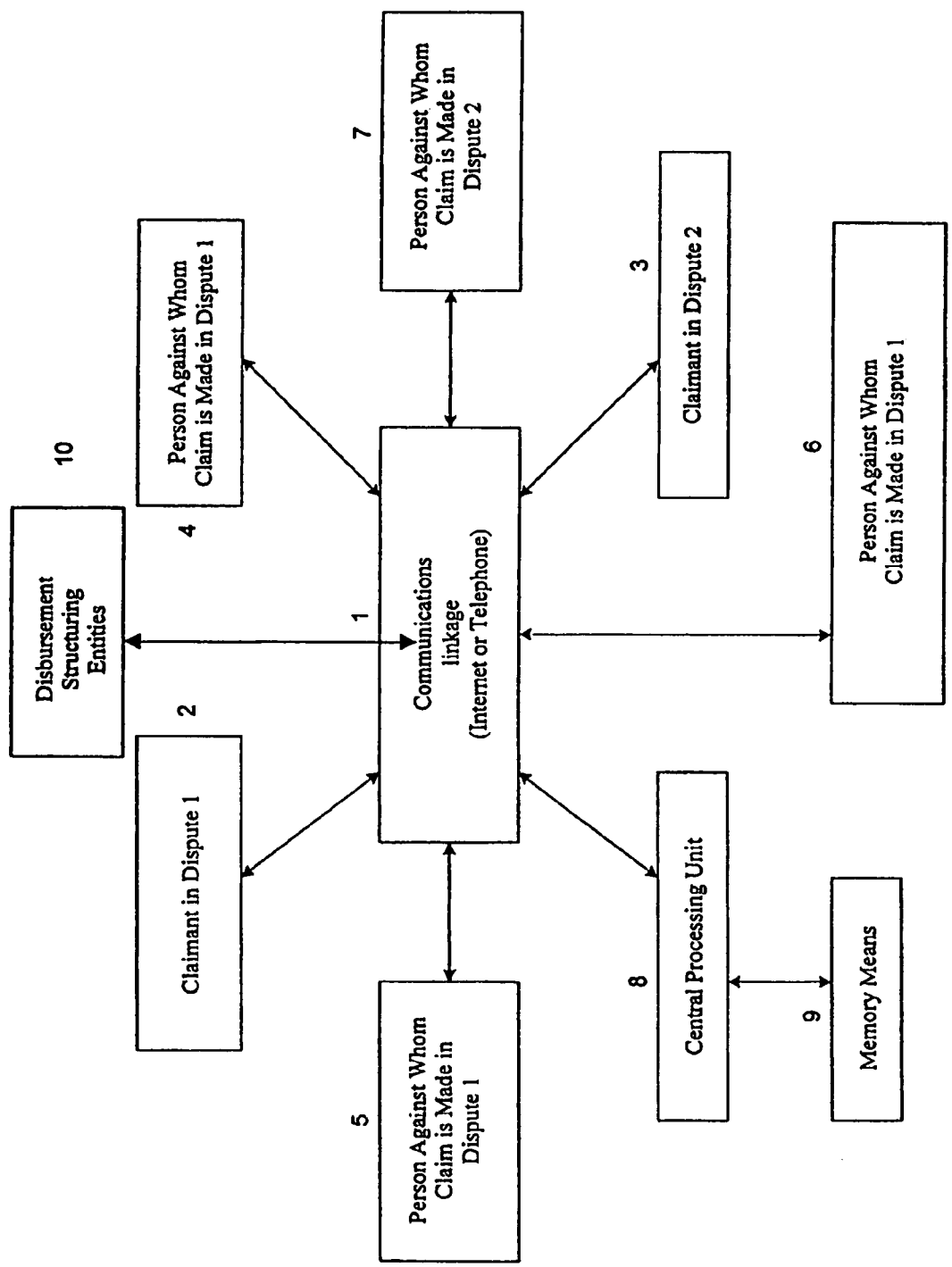
FIG. 1 is an overview of the computerized system usable to implement the present invention.

A computerized system for automated dispute resolution accessible on-line, for example through an Internet website via the Internet or other communications linkage is created for communicating and processing a dispute between two persons using a series of demands to satisfy a claim and a series of offers.

The system compares demands and offers on a round-by-round basis in accordance with preestablished conditions.

A "demand" is the amount of money (or equivalent value) required by the person having a claim against another person, such as a defendant or his or her insurer, for which the person with the claim would be willing to settle. Information corresponding to the amount of the demand is entered by the claimant, or his or her representative, by using the numbers of a touch-tone or cellular telephone or the keyboard of a personal computer. An "offer" is the amount of money (or suitable value) the defendant or the insurance company will settle the claim.

A person involved in a dispute is anyone or any company who has a claim against another person or against whom another person has asserted a claim, whether litigation is pending or not.

The system communicates and processes the demands and the offers using at least one central processing unit by pairing offers and demands and comparing them. The computer system includes operating system software for controlling the central processing unit, a way to introduce information into the central processing unit, and memory for storing the information.

The basic preestablished conditions under which the comparison is made include the following:

If the offer in any round is less than the demand and within a preestablished percentage, for example thirty percent, of the demand in the same round, i.e. the offer is greater than or equal to seventy percent of the demand, the claim is settled for an amount in accordance with a first preestablished formula, for example, the median amount between the demand and the offer.

If the offer in any round is the same as or greater than the demand, the claim is settled for the demand amount.

If the offer is not within the preestablished percentage of the demand in all rounds, for example if seventy percent of the demand is greater than the offer, the claim is not settled unless the difference between the offer and demand is less than a preestablished amount, for example $5,000, in which case the claim is settled for an amount in accordance with a second preestablished formula, for example at the median amount between the demand and the offer. Thus, first and second preestablished formulas may be the same as or different from each other depending on the agreement of the parties.

The system preferably is designed to allow a user to communicate with the system through a standard PC computer and modem via the Internet. The system may also include a voice message system or voice message generator to allow a person communicating with the system to do so through a touch-tone or cell phone linkage or to guide the person in the use of the system. Security is preferably included to make the system inaccessible without entry of the proper information, for example, a case identification number identifying the dispute, a security code corresponding to the dispute, and a user security code corresponding to the dispute and identifying the user, the user being the person or representative thereof who is making the demand or offer, for example, the attorney for the person on whose behalf the demand or offer is made.

Preferably, the computer is secure, for example by the implementation of a "firewall.about. or protective barrier against unauthorized traffic or the use of encryption technology, and each case is preferably triple-password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card. Advantageously, if the smart card is used, certain embodiments will allow a settlement to be completed by direct transfer of funds onto the claimant's smart card.

Still further advantages may be realized when transfer of the settlement value in resolution of a given dispute can be automatically, if not immediately, be made to the claimant.

Yet another advantage may be realized by offering to a claimant an option to choose the form in which the settlement value is disbursed. A disbursement of the settlement payment can take any conceivable form, for example, a structured settlement annuity, credit for products of services offered by a business organization, investments, or the creation of a trust.

The claimant may choose from any number of disbursement options for the settlement value. For example, an insurance company or other disbursement structuring entity (DSE) could offer the claimant the choice of a five-year or a seven-year annuity with half the value given up front at a given percentage yield. The claimant would also be given the option to choose a lump sum payment along with the annuities offered by the DSE. A DSE is any entity that provides disbursement options for achieved settlement payments. Examples of DSEs include, but are not limited to, insurance companies, financial intuitions such as banks and investment firms, or even private entities seeking capital.

We have also recognized that some of the claims which can not be settled using the basic configuration automated dispute resolution arrangement can nonetheless be settled in an efficient automated manner which has similar advantages but removes some of the rigidity of the basic arrangement through the use of either a facilitator, a "power" round or both.

We have also recognized that yet further advantages may be achieved when a windfall relative to a normal payment is provided to an initiator, i.e. the first adversary to present a particular dispute for resolution. Initiator respondents benefit in a savings because the payment they would make relative to a normal payment for a pair of values is less. Initiator claimants benefit in a windfall increase relative to a normal payment for a pair of values.

In a fully automated system, strategies, evaluations, or other work product are directly or indirectly disclosed to anyone, including an adverse party and offers and demands that do not result in a settlement are never revealed to anyone. In a system implementing a facilitator, disclosure of information to the facilitation is limited and controlled.

Additional advantages may be achieved when settlement documents are automatically generated by the system for provision to the parties.

Advantages are also achieved when documents for structured settlements are automatically generated by the system.

FIG. 1 shows the basic system using the Internet or a telephone as the communications linkage.

Preferably, the central processing unit receives the settlement offers and a plaintiff or claimant enters demands in communications with the system within a period of time, for example, 30 days. Time keeping is performed to record the entry of the demands or offers over the selected time period.

Preferably, there will be three offers for each claim in a normal negotiation arrangement. In those instances, each demand will be compared with the offer of the same number (i.e. Demand #1 to offer #1, Demand #2 to offer #2, etc.). The computer matches the settlement offer against the claimant's demand and performs its programmed calculations in order to determine whether or not a settlement has been achieved. Where the demand and offer intersect in accordance with preestablished conditions, settlement is reached. In the intersection case where the demand is less than or equal to the offer, then the case is settled at a settlement amount equal to the demand. In the intersection case where the demand exceeds the offer, the system will preferably split the difference if the offer is also within a preestablished percentage, for example 70% of the demand (i.e. demand.times.0.70<=offer) . In such case, the settlement amount is calculated to be the median of the two, i.e., the demand plus the offer divided by two. If 70% of the demand is still greater than the offer, there is no settlement unless the difference between the demand and offer is less than a preestablished amount, for example $5,000, in which case the claim is settled for the median amount between the demand and the offer.

Additionally, as an option a "power round" option may be made available. With a power round, an additional opportunity is given, or a parameter is changed to increase the prospect of a settlement being reached.

If in any round, there is a successful dispute resolution, the parties are notified via the communications linkage. A settlement payment of a specified value to be paid to the claimant is then calculated, upon which the claimant is notified of the settlement payment. The claimant can then be offered any number of disbursement options for the settlement payment from which he or she can choose.

Thus, in one type of arrangement, the parties communicate only with the computer which acts as a proxy, always avoiding direct communication with each other for purposes of negotiating a settlement. Wasteful personality conflicts, fruitless and unnecessary disagreements, posturing and positioning cannot occur, so the parties deal exclusively with the "bottom line".

Alternatively, a neutral facilitator may be used to assist with settlement negotiations. The facilitator is a computer or a person operating with, or without a computer, according to particular guidelines. Through the use of generic, non-revealing statements, the facilitator the facilitator attempts to induce one or both of the parties to the dispute to adjust their offer(s) or demand(s) into settlement range.

The DSE can also communicate with the computer, thus facilitating immediate offer, selection, and processing of any disbursement option a claimant may choose.

Figure 2:
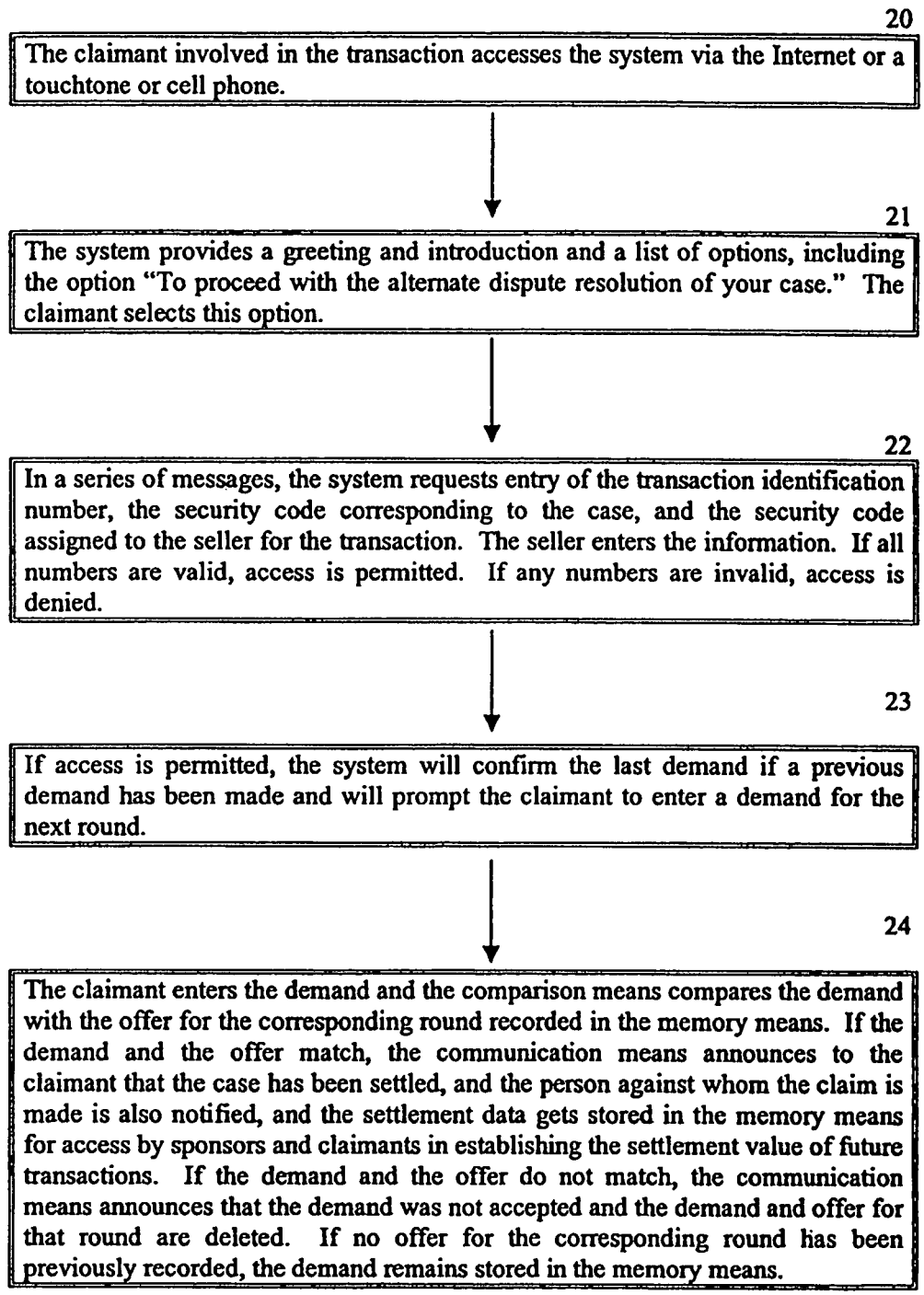
FIG. 2 is a block diagram showing how a claimant involved in a dispute interacts with the computerized system of FIG. 1.

FIG. 2 shows how a claimant involved in a dispute would use the confidential and fully automated system without direct communication with the other side.

The system preferably is also implemented securely so the system is accessible only upon entry of the proper authenticating information, such as a case identification number identifying the dispute, and a user security code corresponding to the dispute and identifying the person or representative thereof who is making the demand or offer.

Preferably, the system is capable of generating voice messages to a person communicating with the system through a touch tone or a cellular phone linkage to guide the person in the use of the system. Alternatively, written messages maybe used as prompts when the system is accessed from a personal computer via the Internet.

The entry of claims and settlement offers may also be expedited by a trained staff of computer professionals. For example, the website or telephone linkage can provide a series of options, one of which places the user into on-line or telephone communication with a customer service representative to answer questions or provide other assistance. Thereafter, the user may access the system by communicating to the processing unit via the Internet or by telephone, e.g. a toll-free number, at any time or day of the week to enter claims or settlement offers. Preferably, the system also has time keeping implemented to record the introduction of the information corresponding to the demands or offers over a period of time. In this way, introduction of information corresponding to demands or offers may be made in a plurality of communications with the system over a period of time. The system can of course be configured to handle multiple telephone calls or other communications from anywhere in the world.

Depending upon the particular implementation, a currency converter is also included. This allows adversaries to negotiate using different currencies, for example, U.S. dollars, Euros, Pounds, Lira, or Yen, without having to take into account the current exchange rate or negotiate using an unfamiliar currency. When offers or demands are entered in such a system, the system automatically converts the offer and demand into a common currency. Typically, this will be the currency specified by the claimant. Alternatively, the currency used can be based upon a joint selection by the adversaries, for example, a Japanese party and Canadian party could select the Euro as the basic currency of negotiation. The computer performs its functions and the result are reported to the parties as they occur in real time without waiting.

The system includes modules which act as a negotiator proxy. This encourages and enables plaintiffs to take a realistic approach to settlement with no risk of appearing irresolute or hesitant since a claimant's financial demands that do not result in a settlement are never disclosed. Preferably, in the normal course, claimants have only three or some other previously agreed-upon number of opportunities or rounds to settle claims using the system, and preferably settlement offers or rounds have only a limited period or "shelf life" in which they are operable, for example thirty days for all rounds, which encourages prompt action by claimants.

The system preferably also collects and processes settlement data generated from a settlement reached through the operation of the system for dissemination and use by users, for example sponsors and claimants, in establishing the settlement value of future cases. Settlement data may also be used by facilitators in prompting one or both parties to adjust the amount they propose for settlement. Means may be provided for a user to access actual settlements achieved through the use of the system in other disputes, for example, through a menu or voice choice provided to the user via telephone or the Internet whose selection provides the user with information about prior settlements. The data may be tabulated in the memory so as to be accessible by certain categories, for example by court, by sponsor, by geographic location, or by other category. In this way, a user of the system can be guided in making demands and offers by actual settlements reached in similar cases.

Since the system is accessible via telephone and/or the internet, claimants need not have an attorney in order to engage the system and settle a claim. Furthermore, incentives for using the arrangement may be provided, either directly, by giving a windfall to the party who engaged the system for the case first, or indirectly, through various payment options or tie-in arrangements.

Various enhancements can also be provided to assist the settlement process. For example, the system may be constructed to generate settlement documents for the parties and/or in some cases, papers for filing in court such as stipulations of settlement or dismissal with prejudice. The system is also capable of generating any documents that assist in the disbursement process.

The invention can be understood readily from the following description of a number of preferred embodiments, with and without particular enhancements, in conjunction with the overview of FIG. 1. The present invention provides an online system, preferably Intranet website via the Internet or telephone accessible or both, to facilitate the settlement of claims by allowing attorneys, claimants and/or claims adjusters to use a simple interface to rapidly post a series of monetary claims for a case to be tested against an algorithm for possible settlement. Preferably, the system also calculates, stores and tabulates settlement data, once a settlement has been reached, for reference by other users and/or a facilitator. The system also provides for the offer, selection, and processing of disbursement options for an achieved settlement.

A person involved in a dispute against whom a claim has been made, such as a defendant or an insurer or other sponsor, preferably submits claims to the computerized system using electronic media and formats agreed upon by the parties. The sponsors preferably can also describe the algorithm amount and percentage, and at the individual claim level, check their potential exposure for claims with a built-in calculator provided by a computer program in the system.

Claimants can make demands directly, without hiring a lawyer, and calculate potential settlement gains for their demands including returns disbursed through a structured settlement or other disbursement option. Claimants may become aware of the system through advertising, word of mouth, links provided on selected websites and/or through affinity or partnership arrangements.

Attorneys for a claimant can make demands in return and calculate their potential settlement gain including returns disbursed through a structured settlement or other disbursement option. Claimants or their attorneys may be invited to participate in the process by an automatically generated letter that is sent out once the sponsor enters the case. The claimants or attorneys may then log into the system by special authorization codes provided in the letters.

The parties involved may agree in advance to the algorithm amount and the percentage, or a first person involved in a dispute may enter this data which is then agreed to by the second person. Additionally, the parties may agree to allow for a power round. Depending upon the particular implementation, the power round may involve an additional round, a variation in some criteria and/or an agreement to alter the payment if a settlement is reached. The parties may also be subject to a windfall adjustment, based upon who engaged the system first for the claim.

In an Internet-based embodiment of the present invention, an Internet website is set up to provide the interface between system and user. Preferably, the major areas of the website include a login area for sponsors or their representatives, a login area for claimants or attorneys for claimants, and a login area for administration personnel who oversee the system. If desired, the website may also include a publicly accessible area that highlights information about the system. For increased security, a separate website may be set up with this information.

The website can also include a login area for DSEs that provide disbursement options for achieved settlement payments. Examples of DSEs include, but are not limited to, insurance companies, financial intuitions such as banks and investment firms, or even private entities seeking capital.

Individuals using the computerized system preferably must log into the system before they can manipulate any data. Preferably, they can view, enter and change only that information that is within their access limits—as an attorney for claimant, a directly accessing claimant, a sponsor user, a sponsor administrator, or a system administrator or a DSE.

A sponsor user is a claims adjuster or other agent who works for a sponsor, for example an insurance company or large self-insured organization, which has entered into an agreement to use the computerized system. A sponsor user is preferably limited to entering and reviewing cases relevant to their own entered cases, not cases entered by other sponsor users of the same sponsor.

Thus, a sponsor user preferably may enter the website to login to the system, for example by using a user name and password combination or pair, read and agree to an agreement for the sponsor's participation in the system, assign new cases for claimant attorney participation, and review any completed, pending or in-process cases that have been entered into the system by that sponsor user.

A sponsor administrator is a sponsor user who has been granted administrator privileges by the sponsor. Preferably, in addition to performing all the tasks that a regular sponsor user may perform, a sponsor administrator may enter the website to change sponsor contact information, change sponsor user login and contact information, add or delete sponsor users, create sponsor users with administrator privileges, and review cases for all sponsor users within the sponsor.

Claimants or their attorneys may enter the website to login to the system preferably using a username and password pair, read and agree to a system participation agreement for the claimant, review case information as prepared by the sponsor, with current case status information, and post claims against a particular case.

Preferably, system administrators who work for a company administering the system assist in the implementation of the system. System administrators with proper authorization, for example username/password combination identifying them as such, may enter the website to review, modify, delete and create sponsors, sponsor users, and sponsor administrators, and review, modify and delete and create cases or claims to be processed by the system. Preferably, a case report writer may be provided containing current case status information searchable by date, sponsor, sponsor user, case name and status, which is able to be accessed or queried by the system administrator. A more limited form of case report writer may also be provided to claimants and other users of the system in which only information that is within the user's access limit may be searched.

A DSE can be a user who has been granted access privileges by the claimant. A DSE can enter the website to send a datastream which is used to offer to the claimant a choice of disbursement options for the value of the settlement that is reached.

Claimants or their attorneys may enter the website to login to the system preferably using a username and password pair, read and agree to a system participation agreement for the claimant, or review disbursement options as prepared by a DSE. A claimant need not reach a settlement using the instant settlement system and method in order to use the disbursement embodiment of the present invention.

Preferably, the DSE is an insurance company offering investments for structured settlements assist in the implementation of the system. DSEs with proper authorization, for example username/password combination identifying them as such, may enter the website to produce any number of structured settlements, for example a five or seven year annuity payable at a given percentage for one-half the settlement value. A DSE's access may be limited to such information as would be necessary to offer structured settlements.

The system of the present invention is preferably designed to make it easy for either a claimant directly engaging the system, or a claimant's attorney using an on-line connection such as a common Internet browser or telephone to access the system and attempt to settle a legal dispute involving a quantifiable settlement amount.

In using the system, the sponsor accesses the system, for example, with a login to the website. The sponsor may at that time enter any pertinent case information about the case and the claimant attorney. After adding or reviewing case details, the sponsor submits all at once or over time a number of settlement offers, preferably up to three, for each claim submitted. Each settlement offer is identified by Round. For example, a sponsor may enter $40,000 as the offer for the first round (Round 1), $60,000 for the second round (Round 2), and $80,000 for the third round (Round 3). If a power round option is available, the sponsor may also be prompted for information for use in the power round, if one is necessary.

If desired, in website based systems, an online calculator may be used to notify the sponsor user at that time as to what the sponsor's highest potential exposure might be. For example, if the preestablished conditions are such that the case will settle at the midpoint between the demand and offer if the offer is at least 70% of the demand or within $5,000 of the demand, whichever is greater, a sponsor user who enters $70,000 as the offer for a round may calculate that the possible exposure is $85,000 (corresponding to a $100,000 demand, i.e. the highest demand that will trigger a settlement under these conditions).

Once the claim is entered on the system, the claimant or claimant's attorney is contacted, for example by ordinary or electronic mail. (For simplicity, the claimant's attorney will be used but the discussion applies equally to the claimant and to other representatives of the claimant). The claimant's attorney chooses an attorney security code, which is preferably a unique numeric personal identification number ("pin number") that permits the attorney to access the computerized system. The claimant's attorney must also agree to be bound by any settlement achieved by the parties using the computerized system and may also at this time agree to the percentage within which a demand and offer in a round must be for settlement to occur, the formula for determining the amount of the settlement, the amount which may be zero in which the case nonetheless will settle if the difference in the demand and offer in a given round is less than or equal to that amount, and the formula for determining the amount of the settlement in that instance. The claim is now ready for settlement, and the claimant's attorney will preferably have three normal Rounds, or opportunities, to settle a claim, which may be entered over time or all at once.

Referring now to the block diagram of FIG. 2, the claimant attorney or other user (for example a defendant or sponsor) accesses the system via the Internet using any standard web browser or via an ordinary touch-tone or cellular telephone. No special equipment or training is needed by the attorney to use the system. The system "prompts" the attorney at each step of the process and provides automated, on-demand help if needed.

Figure 3:
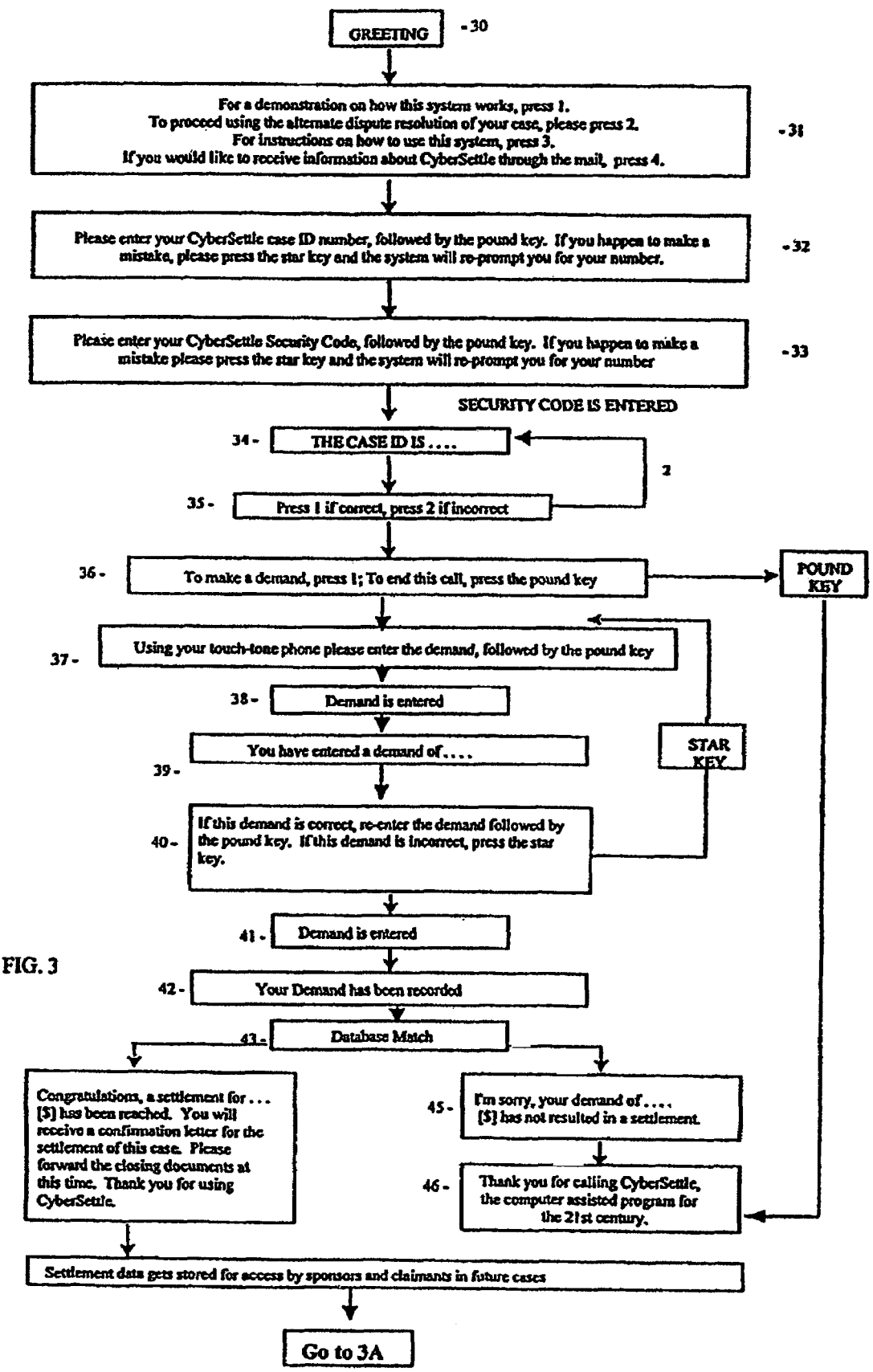
FIG. 3 is a block diagram of an example of how an embodiment prompts a person involved in a dispute in the use of the system.

For example, referring to the block diagram of FIG. 3, upon accessing the system, the user is met with a greeting (step 30) followed by a number of options that may be selected by pressing the appropriate number of a touch-tone or cellular telephone (step 31).

In steps 32-35, the attorney's pin number and preferably two numeric "passwords" are required to commence the alternate dispute resolution of a claim. The system preferably generates a voice confirmation of the information which the user may confirm or cancel and reenter the information (see step 34). The system may, upon confirmation of the information, determine the correctness of the information and the user's authorization to access the system for that case. After entry and confirmation of the required numbers, the attorney follows the prompts and enters demands using the telephone keypad or by typing in the demand at his or her personal computer. The system may also request confirmation of information entered by the attorney. See FIG. 3 for telephone-based embodiments.

The computerized system is designed to adhere to the will of the parties and makes no attempt to "force" a settlement. No information concerning the facts, the law, or the injuries pertaining to the claim is preferably received by the system.

The case can be settled only at a figure agreeable to the parties, not at some figure arbitrarily set by an interviewing third party. Even when a facilitator is used, the facilitator may only make rule driven or generic statements designed to "nudge" the parties into the settlement range and is preferably not directly privy to any of the demand(s) or offer(s) made in a subsequent round. Thus, the parties can resolve disputes fairly using the system without relinquishing settlement authority.

Rounds may preferably be completed in one, two or three calls or computer sessions within a given time period, preferably thirty days. Once entered, the system instantly compares each demand to the settlement offer for each Round. If the demand and offer match or are within some preestablished range, the case is settled. For example, if the offer is within twenty percent of the demand, the claim is settled in accordance with a preestablished formula, for example the claim is settled for the median amount. If the offer and demand differ by more than twenty percent in all three Rounds, the case will not settle or, if available, will invoke a power round. If, during the normal rounds, the settlement offer is the same as or greater than the claimant's demand, the claim is settled for the demand amount.

Preferably, the preestablished conditions are such that even if the offer and demand differ by more than a preestablished percentage in all three rounds, the claim will nonetheless settle if the offer and demand are within a preestablished amount, for example $5,000, in which case the claim will settle in accordance with a second preestablished formula, which may again be the median amount.

Two examples of a series of normal rounds and the results are given in Table 1. In these examples, the first preestablished formula is the median amount between the offer and the demand. In Example 2, the preestablished amount is $5,000 and the second preestablished formula is the same as the first preestablished formula, i.e. demand plus offer divided by two equals the settlement amount.

TABLE 1

| Round | Claimant's Demand | Settlement Offer | Result |
|---|---|---|---|
| EXAMPLE 1 (preestablished percentage: 80% of demand) | | | |
| 1 | $200,000 | $40,000 | No Settlement |
| 2 | $150,000 | $60,000 | No Settlement |
| 3 | $100,000 | $80,000 | Settled for $90,000 |
| EXAMPLE 2 (preestablished percentage: 70% of demand) | | | |
| 1 | $ 19,000 | $4,500 | No Settlement |
| 2 | $ 14,000 | $6,500 N | No Settlement |
| 3 | $ 12,000 | $8,000 | Settled for $10,000. |

Preferably, the system promptly notifies the parties of a settlement, for example while the user is online or via email to offline parties or by telephone, and follows that notice with a written confirmation. Unaccepted offers and demands expire without further action by any party, preferably after thirty 30) days.

The processing of the case data begins when a person involved in a dispute, preferably a party representing a person against whom a claim or series of claims is made, for example a sponsor, or an unrepresented claimant engaging the system, enters into the central processing unit a series of rounds of offers to settle the dispute (or if the claimant, a series of rounds of demands to satisfy the claim). The information as to a claim is submitted electronically in a format compatible with the system, for example via phone input or PC input fed for processing by the central processing unit.

Another person involved in the dispute, for example, when the first entity for the claim is a sponsor, a party representing a person asserting a claim enters a series of demands to satisfy the claim into the system. The demands and offers are entered without disclosure to other persons involved in the dispute. The series of demands and the series of offers are paired up and compared on a round-by-round basis in accordance with preestablished conditions. For example, the parties may agree to be legally bound to settle the case if the demand and the offer in any given round are identical (in which case the claim is settled for that amount) or are within a previously agreed-upon range or formula, for example, within 20% or $5,000 or some combination (in which case the claim is settled in accordance with a previously agreed-upon formula, for example at the midpoint between the demand and the offer). Otherwise, the system goes on to the next round and the values from the previous round that did not result in a settlement are normally deleted. After each round the system communicates to the parties the result of the value comparison, i.e. no settlement or settled at a certain amount.

Figure 3A:
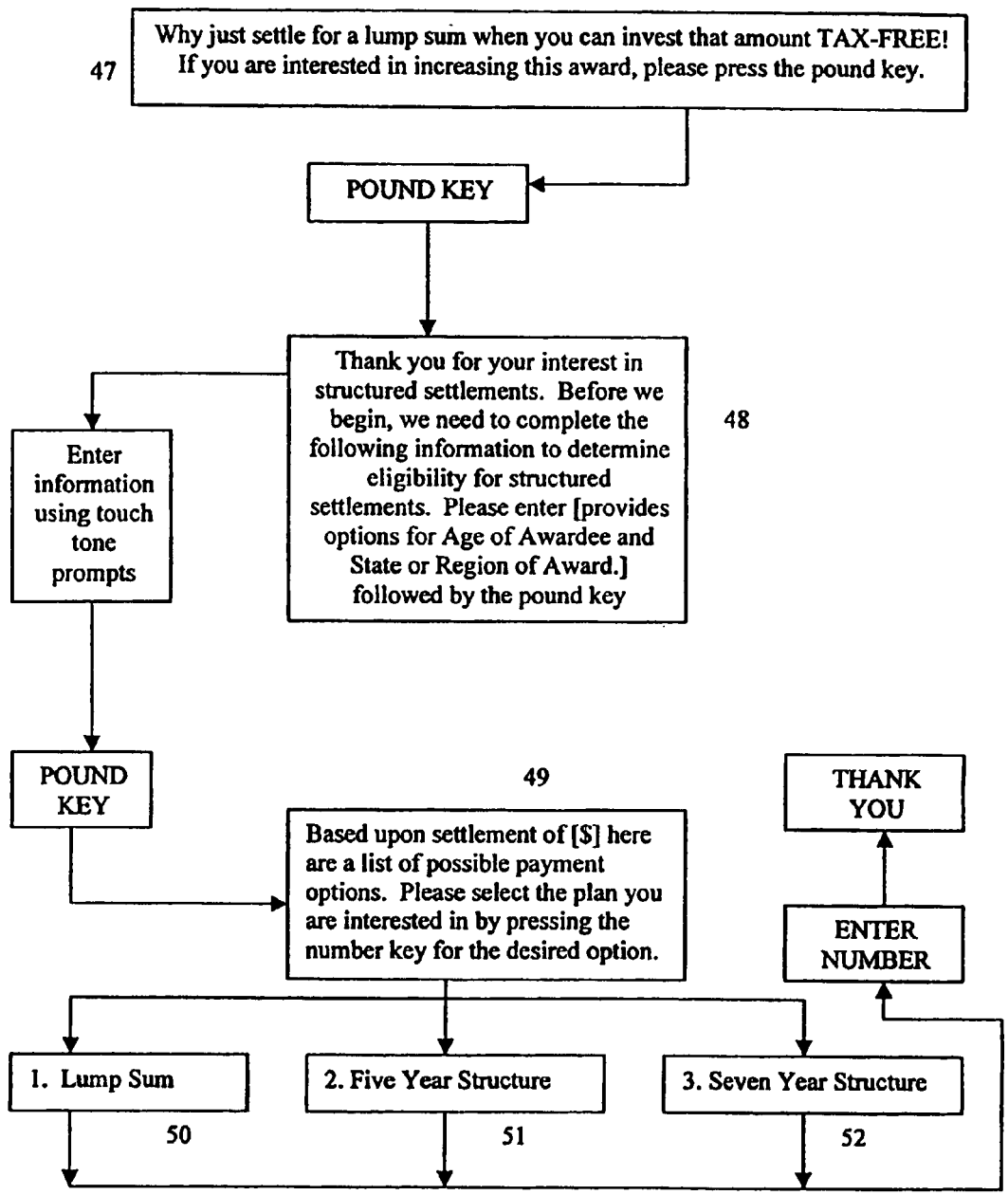

As shown in FIG. 3A, upon realizing a settlement, the system notifies the claimant of the value of that settlement. Along with the notification, it offers to the claimant the option of having the settlement payment disbursed in the form of structured settlements, if desired (step 47). If the claimant chooses to have the option, the system will then ask the claimant for information necessary processing the disbursement option chosen (step 48). For example, if a claimant wants to participate in a tax free annuity the system can ask for the claimants age and location of the award to determine the best annuity option and determine if the annuity can be offered in region of the award. Such information may also be gathered or used as is desired or necessary to automatically generate documents relating to the chosen disbursement option. After entering the information, the claimant can choose from a series of disbursement options, for example, a lump sum, a five-year annuity for one-half the award payable at a give percentage, and a seven-year annuity for one-half the award at a given percentage.

The computerized alternate dispute resolution may be implemented in Internet-based embodiments using a computer program representing a distributed database application written in a Mark-up Language such as ColdFusion Markup Language and HyperText Markup Language (HTML). The system preferably is distributed through ColdFusion Server extensions which allow for interactive processing and Microsoft's SQLserver to allow attorneys and claims adjusters to access it via a standard web browser such as versions 3.0 and up of Microsoft Internet Explorer and Netscape Navigator, which can be found on a variety of platforms, including Microsoft Windows, Macintosh, and UNIX-type operating systems.

Information entered for a dispute is submitted to a central database via the Internet. The database preferably indexes sponsors, sponsor users and administrators associated with that sponsor, and cases associated with that sponsor. It also preferably indexes attorneys associated with cases.

Preferably, if a period of time passes without activity when a user is online, for example 20 minutes under normal network traffic conditions, the user is automatically logged out for security precautions. For all or a portion of the data, the system may be designed so that once data has been entered, a sponsor or other user has a period of time, for example 30 minutes, during which it can be modified or withdrawn but after which the data cannot be withdrawn.

Figure 4:
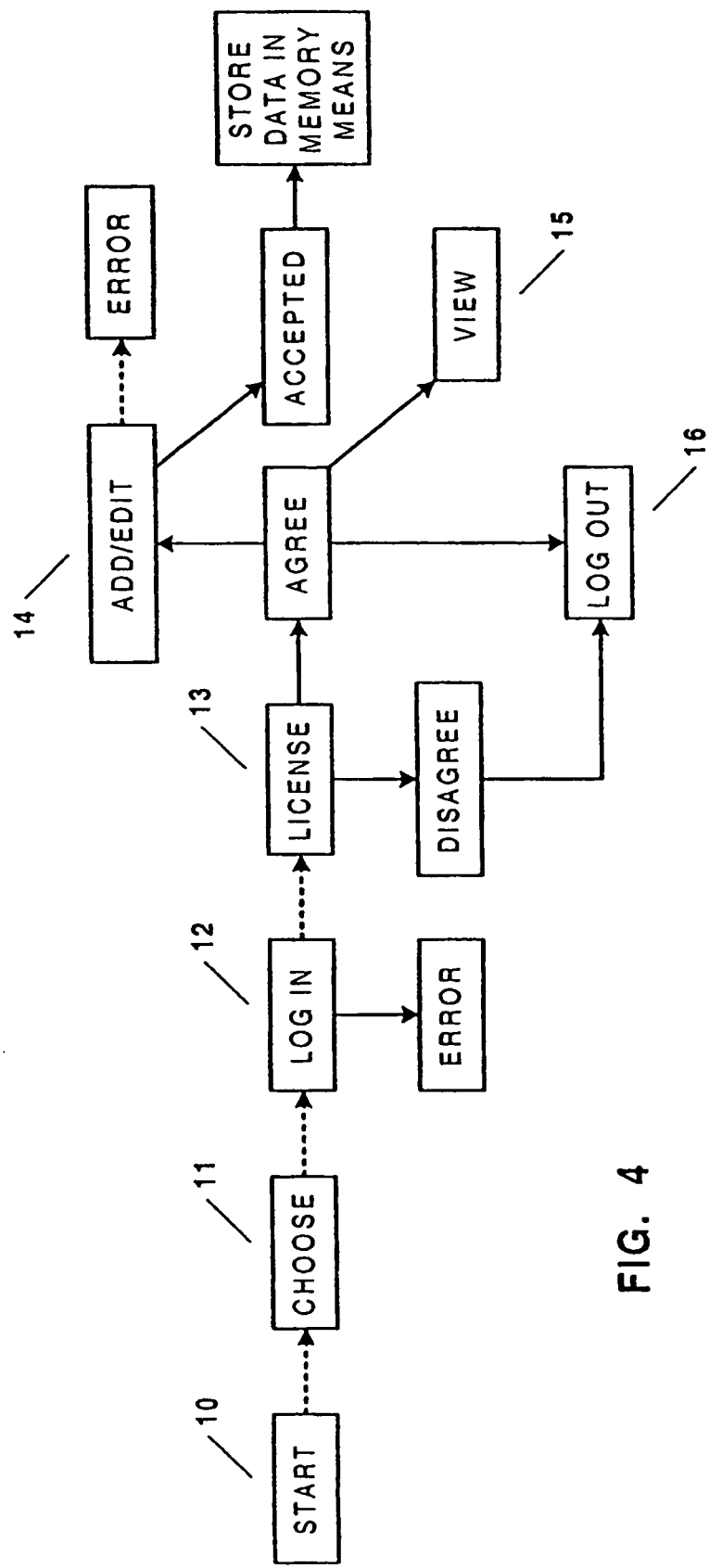
FIG. 4 is a diagram showing the program flow from a user perspective in accordance with a preferred method for operating the system of the present invention via the Internet.

Referring now to the flow chart of FIG. 4, the preferred computer program implementing the system in a normal multi-round negotiation enters at step 10 when a sponsor user opens their web browser (for example Netscape or Microsoft Internet Explorer 3.x or 4.x) and accesses the system website. The user is prompted by a menu with a series of options, one of which is "enter as Sponsor" which is chosen. If desired, the system may automatically write information in the form of ASCII text or "cookies" onto the user's hard drive as a means of keeping track of the user and the user's use of the system. Preferably, the memory means stores this information. Upon access to the system by the user, any preexisting cookies of the user may be modified to reflect the current access of the system by the user. Unless the user has explicitly denied cookies on his or her browser, the computerized system checks for the user's name through a variable saved in the user's browser. If the user has logged in before, the user is greeted by username, provided the user is logging in with the same computer. In step 11, the sponsor user is presented with the choice of adding/editing cases, viewing all cases for that sponsor, or logout. As mentioned previously, preferably all or a portion of the data in the system may not be withdrawn after a period of time in which event the user will no longer be permitted to modify that information. Preferably a menu is provided in which the user may choose one of two links to separate functions. For example, a menu bar may be provided on the left hand side of the screen in which the user chooses by clicking on the appropriate box in the menu bar corresponding to the function. The user's choice is saved through intermediate login and contract screens which follow. Alternatively, step 11 may be implemented following login (step 12) discussed below.

The program next moves to step 12 in which the user must first log into the system before editing or viewing cases. The user must enter a username (unique to the entire database) and a corresponding password. If these do not match the pairs known by the system, the user is shown an error screen with the option to try again.

Alternately, if the user has logged in before with the same computer, his or her username may already be entered into the system, and the server which distributes the web pages checks the user's password against the username. If desired, the system may be designed so that the user has the option to enter a new or different username to allow multiple users to access the system from the same computer.

Computer program modules preferably are written to implement the various steps of the process. For example, a module controlling the sponsor user identity process may be created to hold all variables related to a sponsor user's identity and to cases of that sponsor.

A "ValidateNewUserName" module may be created which is called when the user places an entry in the user name field and leaves the field form. Preferably, the user name entry form has a JavaScript object which checks to see if the username has already been taken, and if so, displays an error message.

Step 13 shows the user a system participation agreement if the correct name and password were entered. The agreement preferably details the terms of use of the system and details regarding the process. Preferably, a button is provided on the menu for either agreement or disagreement with the contract. If the user agrees to the terms of the contract, he or she proceeds to the original menu choice (adding/editing cases, or viewing cases). otherwise, the user is returned to the login screen with all information cleared.

If the user agrees to the participation agreement, the system may send the user to the original menu choice in step 11. Alternatively, the system may be designed to send the user to a menu with the options of assigning a new case, reviewing cases, adding/editing cases or logging out.

If the adding/editing cases choice was originally chosen, the program enters step 14 where an Add/Edit case screen preferably allows the sponsor to enter the following information into the database:

Claimant name
Case Description
Sponsor Case ID
Values for each of 3 settlement rounds
The Claimant Attorney name, firm, address, city, state, zip code, telephone, fax, and email In telephone-based embodiments, some or all of this information may be entered with the assistance of system administrators. In the event that a claimant, upon achieving a dispute resolution, opts for a structured settlement or other disbursement option, the system may ask the claimant for further information, preferably age and locality of payment to determine the eligibility and desirability for tax-free annuities.

The Sponsor case ID is preferably a number used for sponsor internal tracking selected by the sponsor.

The value inputs need not all be entered at one time. The system will prompt the user to enter an amount for each round individually with the option to leave the amount for any given round blank (for entry, if necessary at a later time).

The dollar value inputs preferably include calculator functions which calculate the total possible exposure for the amount entered. The screen also may display the status of the case. Upon submitting the information, the user may be returned a confirmation screen with all entered information upon which the user can choose to accept the changes or return to edit the case further. Preferably, the system provides the user with a period of time, for example, thirty minutes, to edit some or all of the case information before that information becomes final and is analyzed if corresponding values have also been submitted for the adverse party. Information made final but for which there is no corresponding counterpart, (e.g.: after the period of time has expired), may be edited or withdrawn preferably only by agreement of all the parties.

Preferably, the Add/Edit screen includes a "submit" button at the bottom, which sends the information to be checked for formatting. It points out missing or improperly formatted text, or returns the text for verification. If the text is accepted, the data is sent to the database for entry as an addition or update. Preferably, a sponsor user cannot edit a case in which the claimant attorney has started to submit demands into the system, except to change clerical information such as address and phone number.

A "CaseDataEntry" module may be created to hold a template that processes the sponsor user's entry of case data and add/insert it into the database. The main features of the program are the checking of an expired edit time, and whether or not the claimant attorney has entered a demand in the system. In either event, the form aborts and an error message is presented.

Preferably the program is written so that when a record is to be inserted, the insertion is held up and locked using a suitable program until the system can read the record in order for the details to be displayed back to the user within the screen for confirmation and in order that the system can provide a HREF to its primary key which is automatically assigned by the database.

Another module called "SponsorAssignsCase" preferably drives the sponsor user's entry of a case into the database. The Add/Edit calculator may be any suitable computer program, such as a JavaScript program, which applies the algorithm amounts specified by the sponsor to determine the maximum possible exposure.

If the original choice was viewing all cases, the program moves to step 15 where the View cases screen reveals all the information for a given case which has previously been entered during an Add/Edit choice. The user is also preferably given an option to edit the information, preferably with a specified time limit (e.g. 30 minutes) for the rounds of offers provided a claimant attorney has not started to submit demands. The View screen may, if desired, also display a list of cases that have been assigned to a sponsor user.

Preferably, a module called "SponsorUserShow" contains a template which shows the user these records. If the sponsor user has administrator privileges, the module shows all user records related to the sponsor. A similar module called "SponsorShowCases" preferably functions to show case information.

In step 16, the user may log out of the system from a menu choice to end the session and return the user to the login screen. This menu choice preferably also follows completion of the Add/Edit and View choices of steps 14 and 15. If a user attempts to engage the system again, he or she will have to login their user name/password pair. Preferably, logging out clears the password, but not the user name, so that upon subsequent login the computerized system may check for the user's name in the user's cookie if the user accesses the system with the same computer.

The screens appearing in the operation of the system may be created by suitable computer programs written in a Standard Generalized Mark-up Language such as ColdFusion Script.

The computer program code for the Login screen creates the login form if a user is determined not to be in a logged in state. (FIG. 4, step 12). This form preferably passes on a variable value indicating the user's eventual destination.

The module for the License screen follows the Login program and checks the user's authentication credentials. if the user passes, the License screen is shown (FIG. 4, step 13).

Preferably, a module called Login results follows the License module and sets the user state to logged in. Unless the user has explicitly denied cookies on his or her browser, the program also checks to see if the user's cookie has taken correctly and sends an error message if it does not. If all is correct, the module sends the user on to his or her selected destination.

A Logout module may be used to log a user out of the system. Preferably the next time the user tries to use a menu item, he or she will be prompted for a password and to approve the license agreement.

If the user disagrees with the license, a module following the License module displays the Disagree screen which preferably indicates that the user must agree to the license in order to use the system.

An Access Denied screen may be created to show a user who attempts to access a section he or she does not have authorization for.

A Default page for debugging purposes may also be used to show current user login status. Preferably, this page is for a system administrator, and other users would normally not be able to access this page without mentioning it explicitly.

The above-described steps preferably apply equally to sponsor administrators (sponsor users designated with administrator privileges by the sponsor). However, the system preferably may be designed so that if the user is identified as holding administrator privileges, he or she will see an enhanced version of the sponsor user menu. In addition to providing the user with the option to assign a new case, review cases, and logout, the sponsor administrator menu provides the options to change sponsor information, change his or her own user information, add a user, show/edit users, and remove a user.

If the change sponsor information option is selected, the program sends the user to change the sponsor information screen which allows the user to add/edit sponsor information stored in the database, including:
Sponsor Name
Address
City
State
Zip Code
Phone
Fax
Email If the remove a user option is selected, the program sends the user to user information screens which the sponsor user administrator can use to change, delete, or add information to any sponsor user's record to which they have access for their sponsor.

For example, the user information screen may allow the user to add/edit the following information into the database:
User Name
Sponsor Name
Address
City
State
Zip Code
Telephone
Fax
Email
User name
Password
Active User (yes or no)
Administrator User (yes or no)

Computer modules preferably contain the screen forms for entering and editing sponsor user and new sponsor user information. These modules also may screen users for administrator privileges, for example, before allowing the user to edit records.

Many of the above-described steps preferably also apply to a claimant attorney, i.e. an attorney that represents an individual or company that has dispute or has initiated a lawsuit with a sponsor who has entered into a participation agreement to use the system.

The attorney may be notified, for example, by regular mail, that he or she can login to the website and submit a specified number, for example three, of demands to satisfy a claim according to preestablished conditions. The attorney may be required to sign a participation agreement, preferably mailed to him or her, before given the proper login credentials. Once the attorney signs and forwards the agreement to the system administrators, the attorney is given the proper login credentials.

In a similar manner, a claimant may contact the system to submit a dispute without going through an attorney. The claimant may be required to sign or otherwise acknowledge being bound in accordance with the participation agreement, and in some cases tender some form of payment, to engage the system.

As in the case of sponsor users, the claimant attorney opens his or her web browser and accesses the system website (See FIG. 4, step 10). The attorney, however, chooses an "enter as Attorney" option provided on the menu that appears.

In step 11, the attorney is presented with the choice of reviewing cases placing demands on cases assigned to the attorney. Preferably a menu is provided in which the user may choose one of three links to separate functions via a menu bar on the left-hand side of the screen. As in the case of the sponsor user, the claimant attorney's choice is saved through intermediate login and contract screens which follow.

The program next moves to step 12 in which the user must first log into the system before making demands or viewing cases. A "Login" computer file for an attorney similar to the "Login" file for the sponsor preferably implements this step. Preferably, the user must enter a case identification number, a security code, for example, an internally generated random number which functions as a password), and an attorney security code (preferably, a code generated by the sponsor). If these do not match the information known by the database, the user is shown an error screen with the option to try again.

As in the case with the sponsor user, step 13 shows the claimant attorney a system participation agreement if the correct name and password were entered with the same options and results discussed previously. A "License" file similar to the "License" file for the sponsor user preferably implements this step.

If the user agrees to the terms of the agreement, he or she proceeds to the original menu choice (reviewing cases or making demands). Alternately, the system may be designed to send the user to a main menu with the options of obtaining case information, placing a demand for the next round of the particular claim or settling a different case. A "Login-Results" file and a "Disagree" file similar to corresponding files for the sponsor-user follow the "License" file to implement this step depending on whether the claimant attorney agrees or disagrees. Similarly, "Logout", "Access-Denied", and "Default" files corresponding to similar files for sponsor users preferably are provided.

If the case information option was selected, a case information screen is provided which preferably allows the claimant attorney to view the following information from the database:

Case Name
Status
Claimant Name
Attorney name
Attorney firm
Attorney address
Attorney city
Attorney state
Attorney zip
Attorney telephone
Attorney fax
Attorney email Preferably, the screen displays the current status of the case with the corresponding details of the case without the ability of the attorney to edit any of this information. A module controlling the case status process may be written to hold all variables related to an attorney's cases.

An "AttorneyCaseInfo" module may also be created which displays the information an attorney needs to start making demands against a case. Preferably, the data in the module may not be withdrawn.

If the next round with current case option was chosen, the program moves to a Next Round screen which provides the attorney with the option to place a demand against a particular claim. A "CaseNextRound" module may be created to form a template which determines what the next round is, if any, and places a bid form in front of the user. Preferably, the screen provides a form box in which the attorney places the demand, and if desired menu options to either test the demand against the exposure calculator (preferably implemented by a JavaScript program applying the algorithm amounts specified by the sponsor) to determine the lowest possible amount the case will settle for, or to submit the demand.

After the attorney submits the demand for the next round, the case is submitted for comparison. A "CaseNextRound" module may be created to form a template to determine the results of the comparison based on the information that the claimant submitted on the CaseNextRound form and on the preestablished conditions. Preferably, the preestablished conditions are determined on a sponsor by sponsor basis but may also be case specific.

If the demand and the corresponding offer by the sponsor for a given round are within the preestablished conditions, the user is preferably presented with a case acceptance screen. If the demand and the corresponding offer are not within the preestablished conditions, the user is preferably presented with a link to the next round screen, if a round is available, i.e. the previously agreed number of rounds of demands has not been used and a power round is not available. If a round is unavailable, for example, the parties have agreed to three rounds and the claimant attorney has entered three rounds of demands, the user will see a message that the case is now closed in the system.

If the user is presented with the case acceptance screen, the claim is settled and the claimant or attorney is notified of the dollar amount of the settlement, and preferably the details of where to send the final settlement request (e.g., the sponsor's address). As shown in FIG. 4, the system preferably is designed so that upon settlement of the claim, data for the settlement is collected and stored for access and use by sponsors and claimants in establishing the settlement value in future cases.

When the user is presented with the case acceptance screen, the user is also offered on the screen the opportunity to select from a plurality of disbursement options. If the user accepts, a screen prompting the user for information about the awardee of the settlement may, if necessary, be presented. Information such as age or region of award may be necessary for certain disbursement options, for example, tax-free annuities. After the user has entered the information, the user is presented with a disbursement acceptance screen from which the user is prompted to select from the plurality of disbursement options.

Preferably, the system is administrated by a system administrator who may be an employee of a third party who has been granted login rights to the administration function of the system for the purpose of adding sponsors, generating reports, or performing customer service on the website.

The system administrator reaches the website by opening his or her webbrowser, pointing it at the website interface and entering in appropriate identification numbers or passwords identifying him or her as an administrator. A module may be created which contains an administrator form for the assignment or editing of a case.

The administrator may then be presented with an administrator menu which provides the following menu choices:

Sponsor options, including the options to add/edit a sponsor and to show a list and links to all sponsors;

User options, including the options to show users (preferably a list and links to all sponsor users, searchable by user name and sponsor name), to add a new user, and to delete a sponsor user;

Case options, including the options to show cases preferably by a list and links to all cases, searchable by case name, sponsor name, start date, end date and status, to assign a new case, and to delete a case; and Site options (testing modules) including the options to clear cookies for the purpose of losing stored login information, to logout for the purpose of logging out the system and if desired to clear cookies, and to show login status for current login details.

Preferably, modules may be created to facilitate these options. For example, an "AdminNewSponsorUserEntryForm" module may be created which contains an entry form to enter a new sponsor user. Preferably, this form is different from the regular form because of the username checking that occurs during the user's interaction with the page.

An "AdminGetSponsorNewCase" module may be created which chooses a sponsor for the purpose of adding a new case. Preferably, the identity of the sponsor should be known when a case is added so that the case may be properly assigned to a sponsor user.

An "AdminShowCases" module may also be created which shows all open cases in an administrator form.

An "AdminSponsorUserDataEntry" module may also be created to hold a template which inserts or updates a sponsor user. The module makes a query to obtain the primary identification of the user, if the system does not have this information, in order for the system to set an edit link.

An "AdminSponsorUserEntryForm" module may also be created to hold a template representing the entry form for sponsor user administrator information.

An "AdminUserShow" module may also be created which an administrator form to show all users.

A "CaseDataEntry" module may also be created which a form to enter/insert cases into the database. If the Add/Edit a Sponsor option is chosen, an Add/Edit screen preferably appears to allow the administrator to the following information from the database:
 Sponsor name
 Address
 City
 State
 Zip Code
 Phone
 Fax
 Mail
 Algorithm amount
 Algorithm percentage
 System ID
 Active Account (yes or no)

"SponsorDataEntry", "SponsorEntryForm", and "SponsorShow" modules may be created to add a new sponsor to the database and show a return page, to contain an entry form to enter a new sponsor, and to show a table of all sponsors entered into the system.

"ValidateNewUserName" and "ValidateUserName" modules may be created which check to see if a username exists in a sponsor table and if so, display an error message. Preferably, these modules are called from a JavaScript lost focus event. The ValidateNewUserName module preferably gives no consideration to the current username as it assumes that there is none.

The Delete User option provides the administrator with screens in which the administrator can change, delete or add information to any sponsor user's record as in the case with the sponsor administrator's remove a user option. Preferably, a "DeleteUser" module and a "RemoveUser" module may be created which show the form that allows a user to delete a sponsor user and perform the database call to remove a user.

The Add/Edit case option provides the administrator with an Add/Edit case screen similar to the sponsor administrator's Add/Edit Case screen. In addition, the system preferably allows the administrator to add case status information including:
 Case Status
 Last sponsor edit (date-time)
 Edited by
 Sponsor name
 Last attorney edit (date-time)
 Last administrator edit (date-time)

A "DeleteCase" module and a "RemoveCase" module may be created to show the form that allows the user to delete a case and to perform the database call to remove a case.

Preferably, the system also provides a report writer or searchable module of case information for reporting purposes. By querying the report writer, the status of any number of cases may be viewed by the administrator for the purposes of internal reporting.

Preferably, case information may be searched based on the following criteria:
 Case Name
 Sponsor name
 Status
 Assigned date (start and finish dates)
 Modified criteria (start and finish dates, for example, all records modified in a particular day)
 Show only records unmodified by an attorney The selected platform and hardware to implement the system should be scalable enough to handle large loads of traffic and data, while being responsive to user requests.

Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. Preferably, the application server is a popular platform in which to build applications of this type in order to support future changes, add-one, modifications, etc.

The server preferably is an open architecture computer that has the ability for failed hardware parts to be replaced swiftly. This configuration also maintains the availability to increase the power of the machine or demand. For example, a computer having an Internal Pentium 400 MHz Processor, with 128 MB SDRAI4, a pair of multi-Giga Byte Hard Drives, a Promise PCIRAID Level 0 Controller or a RAID Level 5 Controller, a 32.times. CD-ROM, and 3-COM 10-BaseT Ethernet Card is suitable for use in the system.

The platform for use in the system preferably has the ability to work with open database systems, provide a reliable and scalable platform for Internet and line of business applications, and offer breed file and print services that give users easy and effective access to information and resources. For example, Microsoft Windows NT Server 4.0, or 4.0 (Enterprise Edition) system, a powerful multipurpose server operating system, is a suitable platform because of its broad support of many application servers, its scalability to support the system of the present invention and its popularity with developers who create applications of this type. The platform preferably integrates the following services into underlying operating system infrastructure:
 Built-in networking and communication services
 Comprehensive Web services for the Internet and corporate intranets
 Complete platform form for distributed applications
 Enterprise-wide directory services
 Integrated and robust security services
 Easy-to-use and flexible management services.

The system of the present invention preferably uses a webserver, such as Microsoft Internet Information Server 4.0, that offers proven scalability and tight integration with the operating system and other products used in the system. The web server preferably includes publishing features, customizable tools, and technologies that permit the creation of Web pages, the publication of information to the World Wide Web, the sharing of files and data on operating systems such as Windows NT, Novell NetWare and UNIX servers, and over numerous databases, including Microsoft SQL Server, oracle, and Sybase databases, and the search capacity for content in HyperText Markup Language and Microsoft office document types, and multiple languages.

Preferably, the webserver offers process isolation, a feature which protects applications and Web sites from failure caused by misbehaving components or Webapplications on the server by running them in separate memory spaces. The webserver should also have, when combined with the operating system, built-in distributed application services that automatically scale to serve thousands of simultaneous users.

Preferably, a high performance, open architecture, scalable database, such as Microsoft SQL Server 6.5 or 7.0, is used in the system.

In one arrangement, the computer program is preferably one which provides a scalable platform to deliver high performance Web applications with any major Web server on Windows or Solaris. Allaire ColdFusion Application Server 3.1 and its cooperating ColdFusion Markup Language are suitable for use in developing the system.

In another arrangement, the computer program is preferably one which provides a scalable three-tiered platform to deliver high performance Web applications with any major Web server on Windows or Solaris. The front end is ASP/HTML, the middle tier is Corn Object written in C++ or JAVA, and the back end is SQL Server and MTS.

Preferably, the system is hosted at a quality data center, such as a worldwide data center company which provides access to the Internet and monitors the servers to ensure that they are responding to Internet requests.

Although in the basic configuration there are numerous advantages to exclusively dealing with the bottom line, there is a potential disadvantage in some cases due to using specific, discrete and quantifiable criteria. Namely, lack of flexibility for close cases. In a given round, the two parties may be very close to a settlement, but unable to consummate it because they are just outside the criteria. However, since the system does not disclose the parties' proposed amounts, they will have no idea how far apart, or close, they are. For example, if, to settle the claim the differential must be within $10,000, the same result—no settlement—will be reached by the basic system or method whether the differential is $10,005 or $75,000.

Optional Additions

To increase the number of claims which could possibly be settled, other optional features can be added. In particular, if the adverse parties do not meet the criteria used in normal rounds but are not far off, settlement may still be possible. Through use of a neutral facilitator, a "power round" or a combination of the two additional claims can be efficiently and expediently settled.

Figure 5:
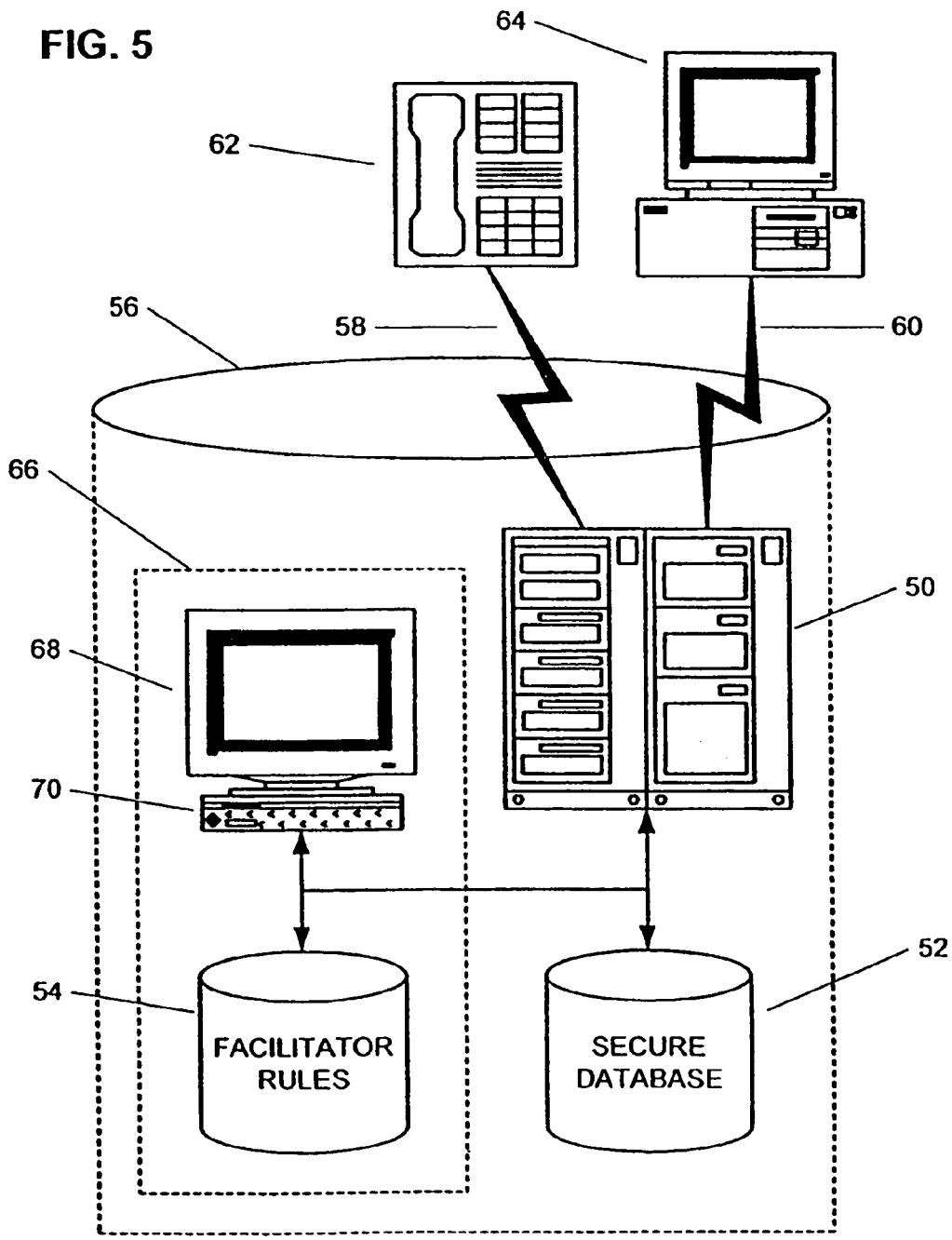
FIG. 5 is an overview of the computerized system including the facilitator.

A facilitator may be optionally employed to communicate a "nudge" to one or more parties to a dispute into submitting a value which is more likely to result in a settlement. The facilitator acts as a neutral automaton, in that it operates in a mechanistic fashion. However, it may in fact be a live person, a computer or some combination of the two. FIG. 5 shows a representative basic system further incorporating the facilitator option. As described above, the system includes a main processor and storage representatively illustrated for simplicity as a server 50 including one or more microprocessors and memory, and an associated secure database 52 stored disk and/or tape accessible to the server. The facilitator option includes, as a minimum, rules or constraints 54 that govern the kinds of encouraging statements that facilitator may use. As shown, the facilitator is implemented so that either the completely automated or partly automated mode may be used. For the completely automated mode, the main processor is guided by programmed rules a constraints and directly communicates with the negotiating entities via the on-line interface 56 illustratively shown connected (by communication links 58, 60) to some entity's telephone 62 and another entity's computer 64. Alternatively a separate facilitator processor 66 may be used to formulate encouraging statements or access available information in order to identify one or more appropriate communications. The facilitator processor 66 communicates with the main processor to provide information for usage by the main processor, either as communicated, or after further formatting or processing. In the simplest case the facilitator processor 66 provides communications in a "ready to go" format, and the main processor merely acts as a conduit. In more complex cases, the main processor may be separately programmed to make further decisions, for example, to select from among provided encouraging statements, or to reformat a selected encouraging statement for communication to one or both entities. The facilitator may also have access to stored information in the secure database, such as offers, demands, prior settlements, geographic information, etc. The facilitator processor 66 may also include a conventional display 68 and input device(s) 70 which allow a live person to act as part of the facilitator 66. The facilitator operates in accordance with a set of prescribed rules, distinct from the criteria for settlement. To perform its function, the facilitator may, in some arrangements, be privy to information in a round that is not revealed to the adverse parties or their representatives. For example, the facilitator may know one or more of: the offer and demand in a given round, the actual numerical differential between the two, the percentage differential between the two, the amount of change or "delta" by either or both entities that would trigger a settlement of the claim, some other information indicative of the potential for settlement, or any or all of the foregoing. Ideally, the facilitator will know the differentials or delta, rather than specific offers or demands, in order to insure disclosure of one party's information to an adversary does not inadvertently occur, particularly when the facilitator implementation involves a human being. Stated another way, the facilitator has some basis for knowing how close to a settlement the parties are, even if the facilitator does not know specifics for either party's proposed settlement figure in one or more rounds.

In the simplest instance, the facilitator may get involved before the first value is provided by a particular party. In that case, the facilitator would likely use information provided by the parties during registration in conjunction with past settlement information to provide a starting point for negotiations. For example, the facilitator might initially communicate with one or more of the adverse parties with a statement regarding the range of past settlements on record for a similar dispute.

By way of example, assume a claimant has been injured and initiated a lawsuit in a particular jurisdiction. The claimant submits the claim to a dispute resolution system incorporating a facilitator. The claimant believes the injury merits a $200,000 settlement. Prior to the claimant submitting any values usable in a round, the facilitator encourages the claimant with the statement "Similar claims have settled in your jurisdiction for between $38,000 and $55,000." The claimant will thus have an indication that their expectation is unrealistic. As a result, the claimant may decide not to pursue the dispute resolution, or may decide to try anyway. As a result of the encouraging, the claimant will ideally provide more realistic demands, thereby increasing the prospect for settlement from the outset.

Alternatively, or in addition, the facilitator could get involved in between one or more rounds. The advantage here is that the facilitator now has available some information relating to the current state of the parties expectations for the particular dispute. Once that information is available, the facilitator would communicate with one or both adverse parties in a neutral fashion in order to induce either or both to adjust their proposal to cause a settlement.

Since it is important that each party's proposed values remain undisclosed to any adversary, communications which either directly communicate amounts or deltas or indirectly allow calculation or reasonable estimation of the amounts are most preferably not used. Of course, in particular implementations, there may be an unusual case where a more specific communication is warranted, but which might allow a party to reasonably estimate the adverse party's proposed number. Assume, for example, the extreme instance where the two parties' proposals were, respectively, $67,100 and $66,000 and the differential for settlement was agreed to be $1,000. The parties differ by only $1,100. In this instance, a communication to both parties indicating "If you each give in on your amount, you WILL almost certainly have a settlement" would probably tell both parties that they were extremely close to settlement and, hence, allow an estimation of what the other entity had proposed. Nonetheless, in such an extreme case, even if the parties were specifically told the proposals they would likely give in to settle. Thus, the prompting or encouraging can significantly increase the chances of a settlement.

In the specific case of a human facilitator, guidelines for formulating neutral communications and/or a set of proposed communications to be adhered to would preferably be used in order to limit the exercise of discretion and constrain the actions of the facilitator. This minimizes the possibility that either party's proposal can be estimated or known. In this manner, a greater degree of flexibility is achieved relative to a fully automated facilitator since the human facilitator can exercise some discretion however, that discretion would be limited.

In the case of a fully automated facilitator or a human acting in conjunction with computer guidance, the rules or guidelines would preferably be programmed into the computer or part of a facilitator accessible knowledge base. These optional configurations more severely limit the discretion of the purely human facilitator, but the computer guided human still allows one or both parties to have human interaction during negotiations, if it is desirable.

Irrespective of the whether the facilitator is a human being, a computer or some combination of the two, the statements made in the communications should be similar. Depending upon factors such as: the identity or sophistication of the parties, the experience of the parties with the particular dispute resolution arrangement described herein, geographical considerations, etc., the statements used as prompts or encouragements may be more or less colloquial. Additionally, the statements should generally have a positive or encouraging bias in most instances so as to reassure the parties that the prospect for settlement is good. The following are a few examples considered to be representative, but by no means exclusive or exhaustive, acceptable statements or prompts:

a) "The insurance company will increase their offer if you decrease your demand."

b) "The claimant has significantly adjusted her demand downward, but the offer must also be increased."

c) "You are close to a settlement but you still must give in some."

d) "Settlement in the next round is a realistic probability if you adjust your [offer/demand]."

e) "The parties are yards, not miles, apart."

f) "The parties should consider reviewing the settlements reached in similar cases before the next round."

g) "You should consider that during your negotiation two similar cases settled, one for $125,000 and the other for $138,000."

As an optional alternative, or supplement, to use of a facilitator, a "power" round may be used. A power round is an additional round which, by agreement of the parties or as a result of an implementation parameter, either gives a slight advantage to one party or changes the rules in a predetermined manner, if the prescribed number of rounds does not cause settlement of the claim. Specifically, a power round may result from a specific agreement between the parties at some point in the process, or be granted based upon application of some system parameter, for example, which party was the first to engage the system for the claim, the differential in the last round relative to other rounds, some mathematical analysis of the offer and demand in the most recent round(s), the amount one or both parties have adjusted their proposal per round, an analysis of the offer and demand vis-a-vis some statistical data tabulated and/or maintained by the system regarding other settlements, or other suitably implemented consideration(s).

Figure 6:
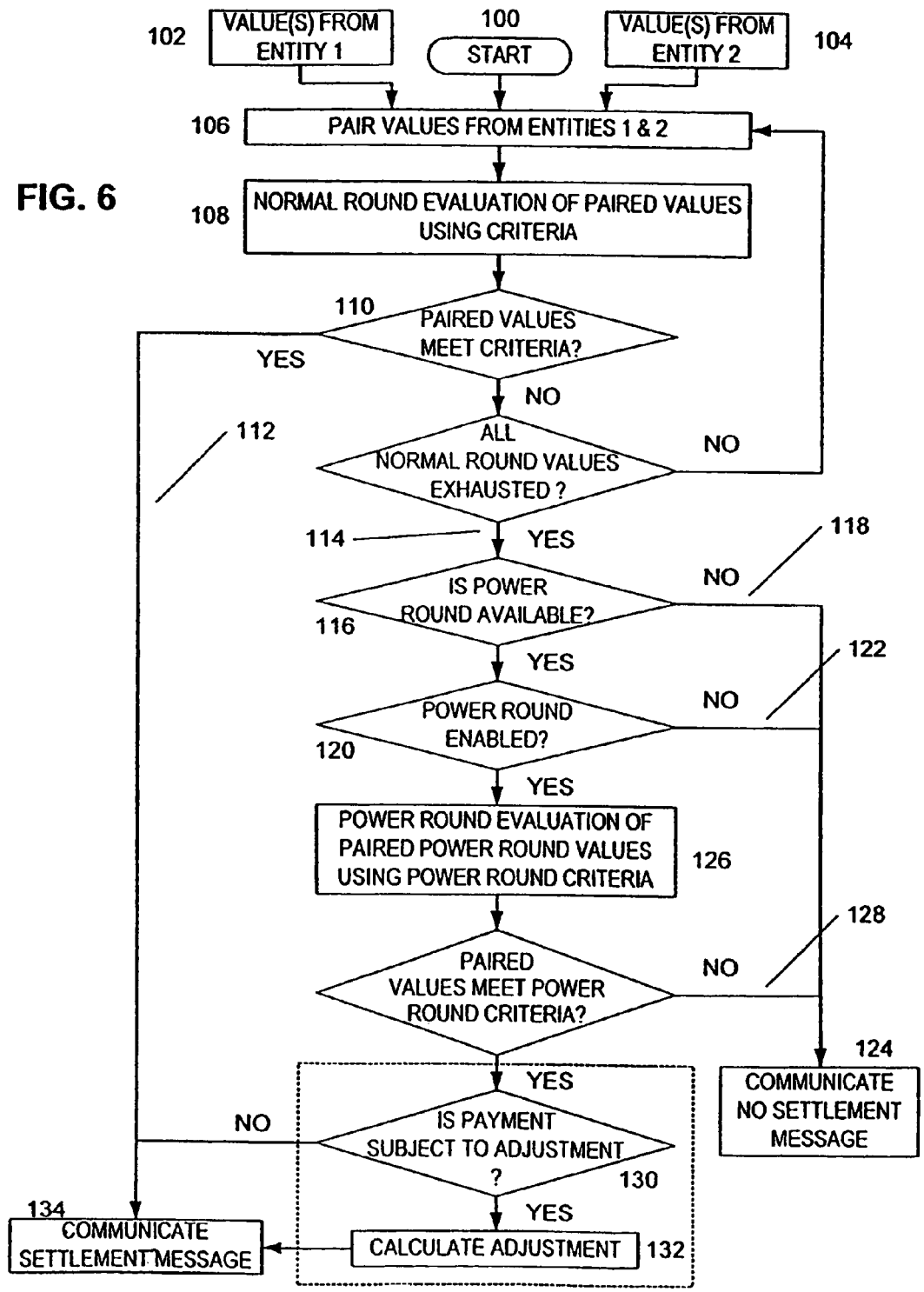
FIG. 6 is a diagram showing program flow from a system perspective for a system including a power round option.

FIG. 6 is shows a simplified program flow when the system includes a power round. The negotiation starts (100) when one entity submits at least one value. Once the system has a value from each entity (if there are only two), the processor receives one or more values from the first entity 102) and for the second entity 104) values are paired 106) and evaluated 108). If a pair satisfy the criteria in the normal manner 110) and a settlement amount is communicated 112). This is essentially the basic system operation described above. If, however, the normal rounds do not result in a settlement, and all the normal rounds have been exhausted 114), the system will check to see if a power round for the negotiation is available 116). If not, the case does not settle 118). If a power round is available, the system will then check if a power round is enabled for this particular negotiation 120). Although not required, this allows the system the flexibility to, for example, ask whether one or more entities want to "buy" a power round, invokes a facilitator intervention (if available), prompt for criteria modification or such other modifications or features considered desirable. If the power round is not enabled 122), due to lack of willingness of an entity to buy one, or an inability of the negotiating entities to agree on the criteria, for example, the case will not settle 124). If the power round is enabled, the system will perform a power round evaluation of one or more pairs of values using the power round criteria 126) or a power round guideline agreed to by the parties. As with the normal rounds, if the power round fails, the case does not settle 128). If the power round criteria is met, the case will settle. Depending upon the particular implementation, the settlement value may be subject to adjustment. In that instance, the system will optionally further decide whether an adjustment is to be made 130), and what it should be 132). The system then communicates a settlement message 134) in the same general manner described above.

In one exemplary power round, following a three round limit, one party, typically the claimant, is prompted to submit a fourth value analysis in conjunction with the last value (in this example, the third) value of the respondent. In this scheme, the system retains, rather than discards, at least the respondent's last value from the final normal round until the power round is complete. The claimant's fourth submission is then analyzed with the respondent's value used in the third round against using a specified criteria. Depending upon the particular system, the criteria used in the first through third round can still be used, or a new criteria can be applied. For example, if the criteria applied in the first through third round was a specified percentage, the system could utilize a different criteria, for example, by changing from the percentage differential to a fixed sum differential, widening the percentage differential, increasing the sum differential, or applying some other preselected criteria agreed to by the parties, the particular criteria allowed or applied in the power round vis-a-vis the criteria in a normal round being an implementation choice.

In any event, if the power round criteria is then satisfied, the case would settle. If not, the case would not settle. Even with the optional power round, once a settlement is, or is not, reached all offers and demands from all rounds that have not already been deleted are discarded.

Another example of a power round is to allow one party to submit multiple additional values (either offers or demands) which are each applied against the last value submitted by the adversary, until either a settlement is reached or the party gives up.

Another example of a power round is to change the settlement criteria for the final round. For example, in a five round scenario, the first four rounds would proceed using a common criteria, but for the fifth, a new or modified criteria would be applied. For example, the parties may have agreed that if a fifth round was required, the system would widen the percentage differential by 2%, increase the actual differential upward by $1,000, or allow some specified adjustment to the formula applied, by some predetermined amount. Then, the fifth round would proceed as with the prior four.

In another power round variant, all of the rounds proceed according in the normal manner and, if the result is no settlement, one or more of the earlier rounds are sequentially rerun under a new agreed to criteria. This power round variant requires keeping all the values until either the case settlement criteria is satisfied or completion of the power round still does not result in a settlement.

In yet another variant, each of the rounds is rerun but the criteria is incrementally changed. For example, if the parties agree to a 3% widening in percentage each round could be rerun, first with a 1% widening, then with a 2% widening, etc. If at any point the criteria being applied is satisfied, the dispute settles. Similarly, a widening by $6,000 could be implemented all at once by an actual widening of $6,000 per round, or for example, by sequential changing the amount in steps by $6,000, $4,000, $2,000 and $1,000 in each of the 1st through 4th rounds or $2,000, $4,000 and $6,000 in a 3 round negotiation.

It is contemplated that still other power round variants may be straightforwardly implemented to similar effect, the important point being the provision of some additional opportunity for settlement using known, although possibly different, parameter(s) compared to a normal round.

As a further implementation detail, it may be desirable to impose some "cost" in return for the power round. For example, if one party gets an advantage in a power round, that party may be required to agree to a previously disclosed adjustment which will be taxed against the ultimate settlement. In other words, in this variant, a party is able to "buy" a power round at a prescribed cost. For example, if the normal payment amount would be based upon the median of the two values that triggered the settlement, a power round settlement payment calculation might involve some adjustment to less than the median for the claimant or more than the median for the sponsor or defendant. In other words, assume a settlement was triggered by an offer of $50,000 and a demand of $55,000. In a round where the normal payment amount would be the median, the normal payment amount would be calculated at $52,500. In a power round, the payment might only be $51,250 to the claimant because the claimant agreed to a $1,250 fixed value adjustment or a calculated adjustment of 50% of the difference between the offer and median in order to buy a power round. Similarly, if the respondent rather than the claimant bought the power round, the payment might be $53,750.

It will be appreciated that, numerous types of adjustments may be made the important point being, there is be some quid-pro-quo on the part of the party buying the power round. Stated another way, this type of power round poses the question: "Would you give in by <some quantity> to have another chance to reach an acceptable settlement?"

It will now further be evident that alternative arrangements can combine the use of a facilitator to prompt for the use of a power round or only use the facilitator for a power round. In one scenario, the facilitator might be the one who suggests the power round after a series of unsuccessful rounds. In another instance, the facilitator might suggest changing the criteria for a power round without suggesting a particular change. This would allow for a greater possibility for settlement while not inviting either party to speculate regarding their adversary's proposals. Thus, the intervention by the facilitator would not affect the neutrality of the system. In yet another instance, the facilitator could intervene immediately upon a power round being "bought" to, for example, provide a statement derived from the tabulated data from prior settlements.

By way of example, a claimant buys a power round in return for a $3,000 decrease in settlement payment. In this power round, the offer from the last round will be compared against a new demand. The last offer was $100,000, the last demand was $118,000, so the difference is $18,000. Assume that, in order to settle, the offer and demand must be within $12,000. The facilitator intervenes with a factual statement, derived from the tabulated data, that: "Over 75% of similar claims to yours have settled for between $85,000 and $110,000 in this jurisdiction" or "Your last offer/demand was off by more than 15% from the average settlement paid on similar claims in your jurisdiction." Having received one of these prompts, the claimant drops the demand to $110,000 and the case settles. In this example, the payment is normally calculated as the median of the offer and demand which satisfied the criteria. Since the settlement resulted from a $100,000 offer and a $110,000 demand, the median is $105,000. However, since the settlement resulted from a power round bought by the claimant for a $3,000 reduction, the settlement payment would be reduced by $3,000 to $102,000.

Although in the basic arrangement, the settlement criteria may also differ among rounds, in some instances it is desirable to enforce a mandatory tier structure, which changes the criteria applied, based upon the demand or offer amount.

For example, the system can be set up so that for a demand or offer below $10,000, the settlement criteria may be one or both of 30% or $2,500. If either the offer or demand equals or goes over $10,000, the criteria changes to 30% or $5,000. If either the offer or demand equals or exceeds $25,000 the criteria may change to one or both of 35% or $8,000. Of course, the specific cut-off point, range within which a criteria applies, or the particular percentage and/or differential amount used within a range may vary from system to system or negotiation to negotiation. Moreover, in some instances it may be desirable to allow one or more parties to specify the particulars for one or more of the above.

Depending upon the implementation, it is possible for a particular demand to fall within one range and an offer to fall in another range. In that case it is preferable to require that the differential between either a) max exposure and minimum gain satisfy the broadest criteria, or b) actual differential between offer and demand satisfy the broadest criteria. Alternatively, prioritizing the usage of exposure/gain versus offer/demand, prioritizing one criteria over another, or requiring satisfaction of both criteria can be employed.

In some instances, particularly when the settlement amount is calculated to be the median, usage of a tiered arrangement can result in a settlement amount being higher than a maximum exposure or, depending upon the other options employed go below the minimum gain.

An example of such a scenario is shown in Table 2.

TABLE 2

| Submission | Criteria | Specifics |
|---|---|---|
| $10,000 | "A" | 30% or $2,500 |
| $10,000 | "B" | 30% or $4,000 |
| $85,000 | "C" | 35% or $10,000 |

| Round | Offer | Demand | Criteria | Exposure/Gain | Result |
|---|---|---|---|---|---|
| 1 | $6,000 | | A | $6,900 | No Settlement |
| | | $13,000 | B | $11,050 | No Settlement |
| 2 | $8,000 | | A | $9,200 | Settlement |
| | | $12,000 | B | $10,200 | Settlement. |

In the above scenario, criteria A applied in both rounds for both offers because they never exceeded $10,000. Similarly, criteria B applied in both rounds for the demands because they both were greater than $10,000. There was no settlement in round 1 because neither the actual offer and demand nor the exposure/gain met the specified criteria.

In round 2, a settlement was reached because the $4,000 differential criteria was met by the offer and demand and both the A and B criteria were satisfied by the exposure/gain differential.

Since the exposure/gain governs the maximum to be paid or minimum to be received, using the median of the $8,000 offer and $12,000 demand would result in a payment of $10,000. However, since the maximum exposure based upon the $8,000 offer is $9,200, the payment amount will be set equal to that exposure rather than the median. In the reverse case, the payment amount would be no less than the minimum gain.

As a further alternative with the tiered arrangement, if the maximum exposure and minimum gain are equal, that condition could be used as a further or alternative settlement criteria. Depending upon the implementation a match between minimum gain amount and maximum exposure could be set automatically trigger a settlement and override any other specified criteria. In the case of a match between exposure and gain, that value would also override the payment amount calculation.

As described herein, sponsors and attorneys may maintain an account with the provider of the dispute resolution system if they expect to submit cases for resolution with some regularity. However, it is well known that for "contingency cases", plaintiffs' attorneys can take one-third, or more, of a settlement payment for fees, expenses and/or disbursements. Advantageously, since the system is directly accessible to non-attorneys on-line, for example, via the internet or telephone, dispute resolution is directly available to the individual without the normal risks or problems which can arise from a person acting as their own lawyer. As a result, claimants and respondents may each benefit in one or more of the following ways.

There are four potential claimant benefits which can specifically result from a claimant directly initiating entry of their dispute for automated dispute resolution in the first instance. First, since the system does not deal with the law or the facts, only the bottom line, a claimant need not be sophisticated, knowledgeable in legal nuances or a capable negotiator in order to obtain an acceptable settlement. Second, the claimant is not subject to a "contingent fee" or other legal costs, although they might be charged some "engagement fee" as evidence of good faith or to discourage the submission of insignificant claims. In keeping with the on-line implementation aspect, the engagement fee will likely be chargeable to a credit card number submitted by the directly engaging party. Alternatively or additionally, the engagement fee could be returnable if a settlement is reached, for example, if a sponsor agrees to pay a fixed fee if the dispute is negotiated using the system or a settlement is reached using the system. Third, the case may be resolved much faster than would be the case through conventional legal or dispute resolution routes since the claimant has greater control over the negotiation since they present the demands rather than authorizing an attorney to settle for no less than a specified amount. Finally, as will be discussed in greater detail below, use of the system may result in the claimant receiving their payment faster and/or more conveniently.

There are also at least three potential benefits when a defendant initiates the automated dispute resolution process for a given claim. First, legal fees are reduced because attorney involvement in the process will typically be minimal, if not nonexistent. Second, in some instances, a plaintiff may be unaware of the potential value of their claim and thus submit demands, leading to settlement, well below what the defendant could be forced to pay thorough conventional legal or dispute resolution channels. Finally, if a claimant can engage the system directly, rather than through an attorney, the prospect of a quick settlement goes up because delays due to backlogs or inattentiveness of attorneys to smaller claims in favor of larger ones are eliminated.

Claimants can be attracted to the system using conventional print, radio and television media, word of mouth, links on websites, partnerships with portals or web based companies, and/or through affinity program arrangements.

For example, insurance companies may offer incentives in the form of discounts on insurance products to claimants who directly engage the system. Alternatively, a company may offer an incentive, such as a higher investment rate on an annuity or reduced fees for a product if the claimant directly engages the system, a settlement is reached, and the proceeds are invested through the company. Alternatively, affinity programs can be arranged with entities such as airlines or credit card companies so that, if a settlement is reached, the claimant will receive frequent flyer mileage or a debit card for the amount of the settlement. Other suitable partnerships and affinity arrangements can be set up, for example, with entities in the travel, investment, banking, automobile, publishing, housing or big ticket item businesses. Depending upon the particular circumstance a payment between dispute resolution system provider and the affinity program partner may be involved.

Another optional variant provides a further incentive to a party to initiate entry of a dispute for automated resolution. In this variant, if initial entry of a dispute is a result of a direct contact, the party submitting the dispute is identified as an initiator. The system logs that fact for later use if a settlement is achieved. The rounds proceed according to the particular implementation used. If a settlement is reached in a particular round however, instead of calculating a settlement amount according to the normal formula, a case resolution payment using a different formula is used which favors the initiator or alternatively a windfall amount adjustment is made to the normal payment amount which would normally be used when there was no "initiator". An example of a no "initiator" instance is when the claim is first submitted by an attorney who has an account with the system.

Depending upon the implementation, if a defendant can be a direct claimant, it may be desirable to require the defendant to "escrow" proceeds such that if a settlement is reached, the risk of post-settlement default is reduced. One way this can be accomplished, for small matters, is by putting through a charge in a specified escrow amount on their charge/credit or debit card. Another way to accomplish this purpose is to require the person to transfer funds from an account they hold into an escrow account maintained expressly for this purpose.

In order to reasonably assess the amount necessary for escrow, the system can utilize the case information provided to identify similar cases which have settled and, using that information, calculate an estimation of the required escrow amount sufficient to meet a settlement, if reached. The system is also preferably set up to credit any overage amount back to the defendant's credit card or account if the settlement figure reached is less than the escrow.

By way of example, a claimant with a currently pending claim arising from an automobile accident sees an article on a consumer oriented website about automated dispute resolution. This causes the claimant to go to the identified website which acts as an Internet interface to an automated dispute resolution system. The claimant submits the claim to the system and is charged an engagement fee of $75. Since the claimant directly contacted the system and the respondent's insurer has not previously submitted this particular claim to the system, the claimant is flagged in the system as an initiator. At some time thereafter, the insurer agrees to also use the system for that claim. The parties agree to a number of rounds and a settlement criteria, submit their respective values and the case settles as a result of the analysis in the second round. The system is set up so that a normal payment amount would be the median of the value submitted by the adverse parties. However, as part of the calculation function, the system identifies that the initiator flag is set for the claimant. As a result, the payment is calculated differently so as to provide a windfall benefit to the claimant. For example, the claimant may receive the offer amount, an amount specified by a new formula, some percent in excess of the median amount, a fixed amount bonus, or the median might be used in place of the lower of the offer or demand in the particular formula, so as to provide a higher payment to the claimant relative to what the claimant could have obtained in the normal case.

In a similar vein, if two parties to a dispute are both individuals and the respondent is the initiator, the "windfall" would be in the form of a reduced payment amount relative to a normal payment amount.

In still other implementations, the "windfall" may only be invoked if there is an initiator and the demand and offer have crossed or pass each other, i.e. in one round the offer is less than the demand and in the next round the offer is more than the demand. In such a situation, the simplest windfall benefit to set the settlement payment to the initiator claimant equal to the full offered amount rather than the calculated normal payment amount. Conversely, the simplest windfall for the initiator respondent is to set the payment they will make equal to the demand.

It will be recognized that the specific windfall adjustment will depend upon the particular implementation used. Accordingly, the important aspect is that the system keeps track of whether a particular party is an initiator and there is some benefit which can accrue to the initiator when a settlement is reached.

Figure 7:
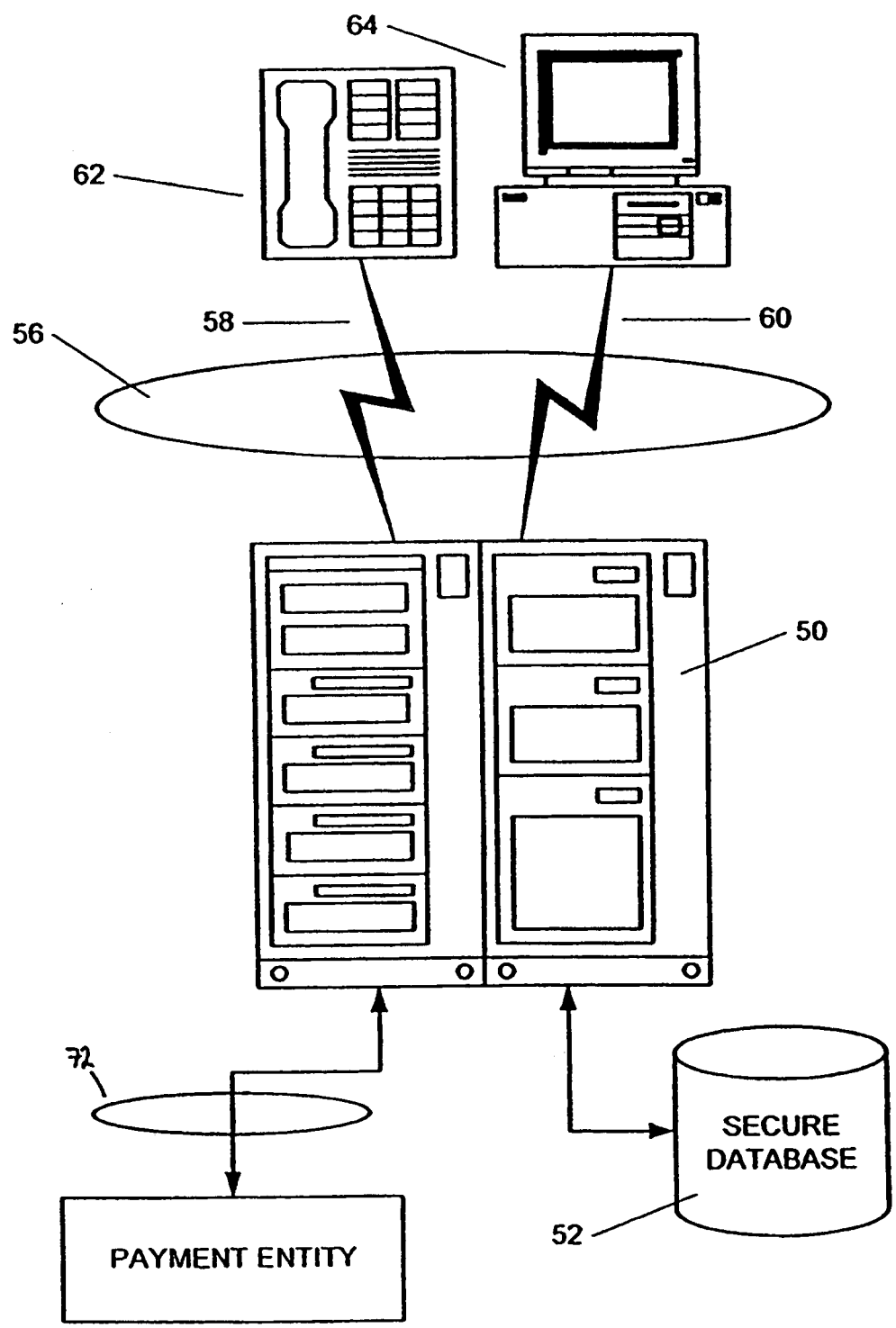
FIG. 7 is an overview of the computerized system including the direct payment interface option.

A further advantage flowing, in part, from the on-line nature of the system is the ability to automatically provide immediate payment to a claimant or initiate an immediate transfer of the settlement payment or value when a settlement is reached. The system FIG. 7 is a simplified system variant which includes an interface 72 to effectuate payment to the claimant automatically. For example, the interface 72 may be to a payment card account system such that if a settlement is reached, and the claimant is a registered cardholder the claimant's credit/debit/charge/entertainment card is automatically credited with the settlement amount. Similarly, if the claimant has a smart card, stored value card, on-line creditable purse or module, or other on-line accessible way for the recipient to automatically (and preferably directly) receive the transfer, the system may be configured to automatically credit it with the settlement amount. Given the numerous ways known to transfer or receive value on-line and the rate of growth in new ways to do so, it will be appreciated that the basic principle is the automatic provision or transfer of value, not the particular scrip, protocol or device used to do so.

Alternatively, the claimant may provide the system with an account number into which a wire transfer of the finds may be automatically transferred.

In some instances, the interface is merely a pre-configured vehicle for communicating with an authority in order to inform the authority that a transfer is to be made. As such, the system is capable of executing a transfer of any disbursement form chosen by a claimant. In this manner suitable arrangements may be made so that the system can convert the settlement into a non-monetary payment-in-kind or transfer. For example, through an arrangement with an airline frequent flyer program, or other program offering "points", the settlement can be converted into the appropriate amount of miles or points. Alternatively, the settlement may involve a non-monetary settlement figure which can automatically initiate a transfer of stocks, bonds, commodities, precious metals, gems, etc., lodged with an escrow agent. In such cases, the value provided by the respondent must be at least equal to the highest offer they will present. In the event of a settlement, the appropriate amount is calculated as the settlement figure and automatically transferred to the claimant. For example, in the case of stocks, the shares will be automatically registered in the name of the claimant. In the case of precious metals, an account will be automatically opened in the claimant's name and a suitable amount will automatically be credited to that account. It will be recognized that, consistent with the description herein, automated dispute resolution would be extensible to apply to other payment-in-kind situations in a straightforward manner.

It may also be desirable to implement the system such that, in response to a settlement, an automatic transfer of title or an ownership interest in something is initiated, for example in the case where the dispute is a divorce and the payment may be made by transfer of title in a vacation home from one to the other party. In such a case, suitable documents authorizing the transfer will be executed but not filed. If a settlement is reached, the system will automatically notify the appropriate entities and provide the necessary documents to effectuate the transfer with a minimum of claimant involvement.

Additionally variants may initiate issuance of some insurance product, such as an annuity or a fully paid up insurance policy in the settlement amount.

One possible drawback to a system which allows a claimant to directly engage the system is the claimant's potential fear that, even if a settlement is reached, attorney involvement may be required in order to consummate the settlement. Advantageously, the system may be optionally constructed to address that concern. In particular, the system may be constructed to automatically generate settlement documents when a settlement is reached. As described above, when the parties engage the system one or more of the parties provide case specific information. The system contains a number of templates which can be used to generate settlement documents appropriate for the case. For example, a settlement agreement and/or release can be generated by extracting the appropriate information provided for the case and incorporating it into the template. Similarly, if sufficient information is provided for a dispute currently pending in a court, the system can use a suitable template to generate a stipulation and/or order of dismissal with prejudice, in accordance with the requirements of the particular jurisdiction. Once generated, the document can be accessed in a form conducive to printing and immediate execution or in a text format which allows further additions and/or modifications to be made to conform to local rules or custom. In the broadest sense, the on-line document feature can be likened to an having an automated clerk make a trip to the local stationary store for the appropriate legal form and type in the appropriate information. Alternatively, particular jurisdictions may restrict the form and type of document provided. As a result, the system is preferably constructed so as to take into account any such limits and restrictions within that jurisdiction and provide all appropriate disclaimers in that regard.

The system may also be advantageously used to automatically generate any documents necessary for the disbursement of the settlement, for example, any documents necessary for the disbursement of the settlement in the form of an annuity.

Multiparty Aggregation Options

Many multiparty negotiations can be directly handled as a group of two party negotiations as set forth above. However, in some cases, particularly when the claim involves a single entity against a group of entities for a claim, aggregation of the group's individual offers or demands can simplify processing.

Depending upon the particular system, the aggregation can be fully or partly blind to some or all of the parties. For example, if a plaintiff has a claim against three separate parties (collectively "the group"), the group can be linked such that the system will still accept individual submissions from each. However, once received, individual submissions from each member of the group will be added to corresponding submissions of the others in the group to form one or more sets of aggregate values. The system is "fully blind" because the individual members of the group are not informed that the aggregation is being performed. An aggregate value is used in the system as if it was an offer or demand submitted by a single entity. In this system, an "AggregateValues" module can be created which sums individual values from different entities sharing a common adversary for a claim. The system will compare the aggregate value against an opposing offer or demand as described above. In other words, once aggregated, the negotiation can proceed as if it was a two party negotiation—because from the system perspective at that point, it is.

It is important to note that, as with the two party negotiation, values submitted by all members of the group are not disclosed to their adversary. Similarly, the system does not disclose the adversary's submission to any member of the group. Depending upon the particular system configuration, the submissions from individual members of the group may not be disclosed to any other member of the group.

In the case of a fully blind aggregation arrangement, individual submissions are not revealed to anyone other than the party making that submission.

An example of a fully blind negotiation is shown in Table 3

TABLE 3

Settle if (aggregate) offer is at least 75% of demand Fully Blind (i.e. Party 1, 2 & 3 and plaintiff do not know offers are combined.

| EXAMPLE 1: ROUND 1 | | |
|---|---|---|
| | Defendant (s) | Plaintiff |
| Party 1 | Offer $10,000 | |
| Party 2 | Offer $15,000 | |
| Party 3 | Offer $35,000 | |
| | Total $60,000 | Demand = $65,000 |
| | Case settles for $62,500 | |
| Party 1 contributes $10,416.67 (10,000/62,500 .times. $62,500) | | |
| Party 2 contributes $15,625.00 (15,000/62,500 .times. $62,500) | | |
| Party 3 contributes $36,458.33 (35,000/62,500 .times. $62,500) | | |
| EXAMPLE 2: ROUND 1 | | |
| Defendant | | Plaintiffs |
| | Party 1 | Demand $25,000 |
| | Party 2 | Demand $18,000 |
| | Party 3 | Demand $35,000 |
| Offer = $70,000 | | Total $78,000 |
| Case settles for $74,000 | | |
| Party 1 receives $23,718 | | |
| Party 2 receives $17,077 | | |
| Party 3 receives $33,205 | | |

A partially blind arrangement allows the group access to each other submissions. To prevent escalation in submissions by one individual based upon the submission of another on the group, it is desirable to only allow an individual access to the submissions of others in the group after all the individual values have been submitted and the values have been locked against withdrawal or change.

An example of this type of partially blind negotiation is shown in table 4:

TABLE 4

Settle if demand and offer differ by less than $2,500 Partially Blind (i.e. Party 1, 2 & 3 know each others offers after all submitted)

| | Defendant (s) | Plaintiff |
|---|---|---|
| ROUND 1 | | |
| Party 1 | Offer $5,000 | |
| Party 2 | Offer $12,000 | |

TABLE 4-continued

Settle if demand and offer differ by less than $2,500 Partially Blind
(i.e. Party 1, 2 & 3 know each others offers after all submitted)

|  | Defendant (s) | Plaintiff |
|---|---|---|
| Party 3 | Offer $9,000 | |
| Party 4 | Offer $11,500 | |
| | Total $37,500 | Demand = $50,000 |
| | NO SETTLEMENT | |
| | ROUND 2 | |
| Party 1 | Offer $10,000 | |
| Party 2 | Offer $15,000 | |
| Party 3 | Offer $10,000 | |
| Party 4 | Offer $13,500 | |
| | Total $48,500 | Demand = $45,000 |
| | Case settles for demand amount of $45,000 | |
| Party 1 contributes $9,278.35 | | |
| Party 2 contributes $13,917.53 | | |
| Party 3 contributes $9,278.35 | | |
| Party 4 contributes $12,525.77. | | |

Another partially blind arrangement allows the group to fully collaborate on a collective submission. In this case, the adversary is informed that the offer or demand is being submitted on behalf of party 1, party 2, etc. The adversary then has the option of accepting or declining. If the adversary accepts, and a settlement is reached, the claim will be settled for all parties in the group and their adversary.

An example of this type of multiparty negotiation is shown in table 5.

TABLE 5

Settle if (aggregate) offer is at least 75% of demand Partially Blind
(i.e. Party A, B & D collectively submit offers as single values and
plaintiff is informed, "You have a claim against Entities A, B, C
& D. Offers are being submitted by Entity A on behalf of Entities A,
B & D. Entity C declines to participate, if a settlement is reached
you may be able to independently pursue your claim against Entity C."

| Round | Aggregate Offer | Claimant's Demand | Result |
|---|---|---|---|
| 1 | $100,000 | $295,000 | No Settlement |
| 2 | $110,000 | $230,000 | No Settlement |
| 3 | $120,000 | $160,000 | Settle for $140,000 |
| 4 | $128,000 | $140,000. | |

Entities A, B and D can then work out among themselves the apportionment, specify an apportionment so that the system will calculate an amount owing for each, or apportion the amount equally among all participants.

In still another variant, once presented with the list of parties making up the group, the adversary has the option of declining to negotiate with the group, but designating some members of the group with whom they will negotiate as a group. In this manner, a plaintiff gets the ability to "opt out" one or more particular defendants, so as to attempt to preserve a claim against them, and a defendant gets to opt out one or more plaintiffs, to prevent one or more individuals, for example, those with a history of dubious claims, from riding on the claims of others.

The aggregations may also be independently performed on both sides of a claim. Thus, a group may submit offers for comparison against another group's demands. Depending upon the particular implementation, the aggregation arrangement on one side of the claim need not be the same as the aggregation performed on the other side of the claim. In other words, offers may be submitted partially blind for comparison against demands aggregated in a fully blind arrangement.

In any case, if a settlement is reached, if the group whose submissions were aggregated will pay on the claim, the payment will preferably be on a pro-rata proportional share. Alternatively, in some implementations, the members of the group can specify a payment allocation other than on a pro-rata basis.

If the group is made up of individual parties who will receive payment, depending upon the particular system, the parties will each receive their respective demands, rather than some median. Alternatively, additional modules can be created which perform more complex apportionment or allocation of payments to plaintiffs.

Additional Options

Since the internet is a globally accessible media, particular embodiments may include a "ConvertEquateLocalCurrency" module created to allow adverse parties to submit offers or demands in their local currency for comparison, even if the offers are submitted in one currency and the demands in another. In this manner, each party can deal with a currency with which they are comfortable, thereby making the negotiation even more user friendly. Where disparate currencies are used, to analyze the offers and demands the system will convert the all the currencies specified to a common currency, which may or may not be the same currency as the offers and demands, for comparison. By way of example, if the offers were submitted in Japanese Yen and demands submitted in Italian Lira, the system might use Yen, Lira, or some third currency, for example U.S. Dollars, Euros, or even Thai Bhat, depending upon the particular implementation.

In a similar vein, an arrangement may be made with a currency exchange entity so that, if a settlement is reached, the claimant can be paid in the currency of choice, irrespective of the currency the respondent used to submit offers. For example, a Greek national submitting offers or demands in U.S. dollars may specify automatic payment by crediting their Athens bank account in Drachmae.

Other optional features include a "StructurePayment" module which will calculate a structured payment from the settlement amount in accordance with specific guidelines submitted by a party. In this manner, spendthrift claimants can protect themselves by specifying that the payment not be provided as a lump sum, but rather incrementally over time. Coupled with one of the above payment options, the settlement could advantageously make monthly transfers to a stored value module, a credit card, a bank or brokerage account, quarterly payments to an insurance policy, or such other arrangements as the system provider can arrange.

Other optional features include the use of different types of communications links (e.g. optical cables or wireless connections); distributed databases; state machines; combinations of secure and non-secure servers; distributed processing; or implementing certain options such as indicators or particular functions in hardware vs. in software and vice versa. Similarly, the principles may be implemented using different types of storage such as tape, solid state, optical, magneto-optical, etc., instead of, or in addition to those described herein.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations or even combinations of those variations described. That alternate embodiments may not have been presented for a specific portion of the invention, or that further undescribed alternate embodiments may be available for a portion, is not to be considered a disclaimer of those alternate embodiments.

One of ordinary skill will appreciate that many of those undescribed embodiments, involve differences in technology rather than differences in the application of the principles of the invention. It will be recognized that, based upon the description herein, most of the principles of the invention will be transferable to other specific technology for implementation purposes. This is particularly the case when the technology differences involve different specific hardware and/or software. Accordingly, the invention is not intended to be limited to less than the scope set forth in the following claims and equivalents.

What is claimed is:

1. A computer program product for dispute resolution the computer program product comprising a non-transitory computer usable medium having computer readable code embodied therein for settling a dispute, the computer program product comprising computer readable code configured to cause at least one computer operatively connected to at least one storage device to perform a computer executable method by a computer comprising:
   a) receiving at least one demand from a first party for a claim;
   b) receiving at least one settlement offer from a second party for the claim;
   c) calculating differences between the at least one demand and the at least one settlement offer in rounds wherein the differences are calculated in a round using one demand and one settlement offer for each round;
   d) determining whether any of the differences fall within at least one predetermined criterion for a settlement, the at least one predetermined criterion including at least one criterion allowing for the settlement when the demand is greater than the offer; and
   e) repeating the above steps until either (i) the claim has been resolved or (ii) a predetermined number of rounds has failed to result in a resolution of the claim, wherein said computer executable method is implemented by the computer, and at least the calculating and determining in any round is completely automated and carried out by the computer.

2. A computer program product according to claim 1 wherein at least the first demand and the first settlement offer are unequal in value.

3. A computer program product according to claim 1 wherein the demand for a given round is received before the settlement offer for that round.

4. A computer program product according to claim 1 wherein demand for a given round is received after the settlement offer for that round.

5. A computer program product according to claim 1 further comprising: limiting the number of settlement offers which may be received to a maximum of three.

6. A computer program product according to claim wherein all settlement offers are received before any of the demands are received.

7. A computer program product according to claim 1 wherein a binding claim resolution is calculated as a function of the demand or the settlement offer in that round, if the differences between the demand and settlement offer in that round fall within the at least one predetermined criterion.

8. A computer program product according to claim 1 wherein the demand and settlement offer in each round are kept confidential from the second party and first party, respectively.

9. A computer program product according to claim 1, which further comprises preventing disclosure of the at least one demand to the second party and preventing disclosure of the at least one settlement offer to the first party.

10. A computer program product according to claim 1, wherein when the claim has been resolved, the method further includes initiating an online transfer of funds from the second party to the first party.

11. A computer program product according to claim 1, wherein when the claim has been resolved, the method further includes automatically transferring an amount for which the claim has been resolved.

12. A computer program product according to claim 1, wherein when the claim has been resolved, the method further includes:
   the demand amount including a value selected from the group consisting essentially of: a monetary value, or an equivalent non-monetary value; and
   the offer amount including a value selected from the group consisting essentially of: a monetary value, or an equivalent non-monetary value.

13. A computer executable dispute resolution method for resolving a claim between two adverse parties in a round-by-round method which requires at least one round, the method comprising:
   in a computer, when executing program instructions, executing the program steps including automatedly testing a pair of values in a first round, one value in the pair submitted by each of the parties; automatedly applying a settlement algorithm to the pair of values to determine if a settlement has been achieved in the first round and resolving the claim if the settlement is achieved; and if the settlement is not achieved in the first round, automatedly calculating a binding settlement payment of an amount at least equal to a lower of the pair of values submitted for a second or subsequent round by applying a settlement algorithm which is binding on both parties,
   the at least one predetermined criterion including at least one criterion allowing for the settlement when a demand value is an offer value.

14. A method according to claim 13 further comprising: limiting the settlement payment to the greater of the pair of non-equal values.

15. A method according to claim 13 wherein a binding claim resolution is calculated as a function of the demand or the settlement offer in that round, if the differences between the demand and settlement offer in that round fall within the at least one predetermined criterion.

16. An automated dispute resolution system comprising:
   a. a processor for receiving at least one demand from at least one entity to the dispute and at least one offer from the other entity to the dispute;
   b. input means for providing at least one criterion to be applied to each demand and each offer made in response to each demand to determine if a settlement can be achieved between the entities, the at least one predetermined criterion including at least one criterion allowing for the settlement when the demand is greater than the offer;
   c. means for comparing the offers and demands by applying the criterion to determine if the offer and demand in a given round result in a settlement; and
   d. notification means for informing the entities after each round whether or not a settlement has been achieved through the application of criterion to that round;
   wherein if a settlement has not been achieved after comparison of the demand and the corresponding offer with the criterion, said processor repeats the process of receiving demands and offers until either:

i.) a settlement is achieved; or ii) a predetermined number of demands and offers have been compared using the same or different criterion.

17. A system according to claim 16, which is executable via the Internet.

18. A system according to claim 16, which additionally comprises means for automatically transferring a settlement amount from the at least one second party to the at least one first party.

19. A system according to claim 18, which further comprises means for receiving the demand and offer amount, where the system is configured to process the demand and the offer amount when the demand and the offer amount include a value selected from the group consisting essentially of: a monetary value, or an equivalent non-monetary value.

20. A computer executable method for dispute resolution, the method when executed comprising:
   a) receiving at least one demand from a first party for a claim;
   b) receiving at least one settlement offer from a second party for the claim;
   c) calculating differences between the at least one demand and the at least one settlement offer in rounds wherein the differences are calculated in a round using one demand and one settlement offer for each round;
   d) determining whether any of the differences fall within at least one predetermined criterion;
   e) if any of the differences fall within the at least one predetermined criterion in any round transmitting a message to the first party and the second party that the claim is resolved;
   f) if, in any round, the differences do not fall within the at least one predetermined criterion, transmitting a message to the first party and the second party that the claim has not been resolved, the at least one predetermined criterion including at least one criterion allowing for the settlement when the demand is greater than the offer; and
   g) repeating the above steps until either (i) the claim has been resolved or (ii) predetermined number of rounds has failed to result in a resolution of the claim,
   wherein said computer executable method is implemented by a computer, and at leas the calculating and determining in any round is completely automated and carried out by the computer.

21. A method according to claim 20 wherein at least the first demand and the first settlement offer are unequal in value.

22. A method according to claim 20 wherein the demand for a given round is received before the settlement offer for that round.

23. A method according to claim 20 wherein demand for a given round is received after the settlement offer for that round.

24. A method according to claim 20 further comprising: limiting the number of settlement offers which may be received to a maximum of three.

25. A method according to claim 20 wherein all settlement offers are received before any of the demands are received.

26. A method according to claim 20 wherein a binding claim resolution is calculated as a function of the demand or the settlement offer in that round, if the differences between the demand and settlement offer in that round fall within the at least one predetermined criterion.

27. A method according to claim 20 wherein the demand and settlement offer in each round are kept confidential from the second party and first party, respectively.

28. A method according to claim 20, which further comprises preventing disclosure of the at least one demand to the second party and preventing disclosure of the at least one settlement offer to the first each party.

29. A method according to claim 20, wherein when the claim has been
   resolved, the method further includes initiating an online transfer of funds from the second party to the first party.

30. A method according to claim 20, wherein when the claim has been
   resolved, the method further includes automatically transferring an amount for which the claim has been resolved.

31. A method according to claim 20, wherein when the claim has been
   resolved, the method further includes automatically structuring a payment by the second party to the first party.

32. An automated dispute resolution method for resolving a claim between two adverse parties in a round-by-round method which requires at least one round, the method comprising:
   in a computer, when executing program instructions, executing the program steps including automatedly testing a pair of values in a first round, one value in the pair submitted by each of the parties; automatedly applying a predetermined settlement algorithm to the pair of values to determine if a settlement has been achieved in the first round and resolving the claim if the settlement is achieved; and if a settlement is not achieved in the first round, automatedly calculating a binding settlement payment of an amount at least equal to a lower of the pair of values submitted for a second or subsequent round by applying a predetermined settlement algorithm which is binding on both parties, wherein the automated steps are fully automated, and wherein the at least one predetermined settlement algorithm includes at least one criterion allowing for the settlement when a demand value is greater than an offer value.

33. A method according to claim 32 further comprising: limiting the settlement payment to the greater of the pair of non-equal values.

34. A method according to claim 32 wherein a binding claim resolution is calculated as a function of the pair of values in that round, if the differences between the pair of values in that round fall within the at least one predetermined criterion.

35. An automated dispute resolution system comprising:
   a. an input and a processor for receiving at least one demand from at least one entity to the dispute and at least one offer from the other entity to the dispute;
   b. an input for providing at least one criterion to be applied to each demand and each offer made in response to each demand to determine if a settlement can be achieved between the entities, the at least one predetermined criterion including at least one criterion allowing for the settlement when the demand is greater than the offer;
   c. a processor and program memory for automatedly comparing the offers and demands by applying the criterion to determine if the offer and demand in a given round result in a settlement; and
   d. notification means for informing the entities after each round whether or not a settlement has been achieved through the application of the at least one criterion to that round;
   wherein if a settlement has not been achieved after comparison of the demand and the corresponding offer with the criterion, said processor repeats the process of receiving demands and offers and automatedly comparing the offers and demands until either:
 i.) a settlement is achieved; or
 ii) a predetermined number of demands and offers have been compared using the same criterion or a different criterion.

36. A system according to claim 35, which is executable via the Internet.

37. A system according to claim 35, which additionally comprises means for automatically transferring a settlement amount from the at least one second party to the at least one first party.

38. A system according to claim 37, which further comprises means for automatically providing a structured payment from the at least one second party to the at least one first party.

* * * * *